(12) United States Patent
Valenza et al.

(10) Patent No.: US 9,143,449 B2
(45) Date of Patent: Sep. 22, 2015

(54) METHODS AND APPARATUSES FOR IMPROVING DATABASE SEARCH PERFORMANCE

(75) Inventors: Salvatore Valenza, Rolle (CH); Leo Caldarola, St-Prex (CH); Roberto Muccifora, Lausanne (CH); Domenico Ficara, Rolle (CH)

(73) Assignee: Cisco Technology, Inc., San Jose, CA (US)

( * ) Notice: Subject to any disclaimer, the term of this patent is extended or adjusted under 35 U.S.C. 154(b) by 205 days.

(21) Appl. No.: 13/562,931

(22) Filed: Jul. 31, 2012

(65) Prior Publication Data

US 2014/0040317 A1 Feb. 6, 2014

(51) Int. Cl.
G06F 17/30 (2006.01)
H04L 12/743 (2013.01)

(52) U.S. Cl.
CPC ........ *H04L 45/7453* (2013.01); *G06F 17/3033* (2013.01)

(58) Field of Classification Search
CPC .......... G06F 17/30097; G06F 17/3033; H04L 45/7453
See application file for complete search history.

(56) References Cited

U.S. PATENT DOCUMENTS

| | | | | |
|---|---|---|---|---|
| 5,032,987 A * | 7/1991 | Broder et al. | ................. | 711/221 |
| 6,665,725 B1 * | 12/2003 | Dietz et al. | ................... | 709/230 |
| 6,697,380 B1 * | 2/2004 | Egbert et al. | ................. | 370/469 |
| 7,779,143 B2 * | 8/2010 | Bu et al. | ....................... | 709/232 |
| 2008/0212597 A1 * | 9/2008 | Baryshnikov et al. | ........ | 370/408 |
| 2010/0274893 A1 * | 10/2010 | Abdelal et al. | ................ | 709/224 |
| 2011/0219208 A1 * | 9/2011 | Asaad et al. | .................... | 712/12 |
| 2013/0036102 A1 * | 2/2013 | Goyal et al. | .................. | 707/694 |
| 2013/0218853 A1 * | 8/2013 | Bullis et al. | ................... | 707/694 |
| 2013/0246651 A1 * | 9/2013 | Keen et al. | ..................... | 709/238 |

OTHER PUBLICATIONS

Song, et al., "Fast Hash Table Lookup Using Extended Bloom Filter: An Aid to Network Processing," SIGCOMM'05, Aug. 21-26, 2005, Philadelphia, Pennsylvania.

* cited by examiner

*Primary Examiner* — James Trujillo
*Assistant Examiner* — Hubert Cheung
(74) *Attorney, Agent, or Firm* — Meunier Carlin & Curfman LLC

(57) ABSTRACT

Methods and apparatuses for improving performance of database searches are disclosed herein. For example, in some implementations, the methods and apparatuses use a data node structure that prevents the need to duplicate data nodes shared by a plurality of data trees. Additionally, the methods and apparatus facilitate improved database lookup times by implementing an adaptive presence detection system based on the Bloom Filter, performance characteristics of the computing device evaluated at run time and status of the database.

20 Claims, 21 Drawing Sheets

METHODS AND APPARATUSES FOR IMPROVING DATABASE SEARCH PERFORMANCE

BACKGROUND

Databases are ubiquitous in packet forwarding devices (e.g., routers). Databases are typically implemented in the form of well-balanced trees such as WAVL trees, for example. These well-balanced trees provide acceptable performance. For example, the lookup, insertion and deletion times of a WAVL tree can be defined as O(log(n)), where n is the number of data nodes in the WAVL tree. However, packet forwarding devices tend to handle increasing amounts of traffic. As databases in packet forwarding devices increase in size, the number of data nodes make any existing scheme suffer and eventually affect the performance of the packet forwarding device.

As an example, when a First Sign of Life (FSOL) is detected for a new session on a broadband network gateway (BNG) router, the new session is searched on a Session Attribute Database (SADB), for example, to avoid creating duplicates or to manage dual stack (IPv4/IPv6) sessions. After performing the search on the SADB, other activities required to properly start up the new session are executed. FIG. 1A is a graph illustrating measured session start time cost on an example BNG router. In FIG. 1A, the measured start time 102 and the average start time 104 are shown. The graph illustrates the session start execution time (in nanoseconds) versus the number of started sessions (0<n<16 k) on the BNG router. The average start execution time includes two components: (1) a fixed cost 101 related to standard start operations and (2) a variable cost (i.e., c(n)) 103 related to the number of started sessions. The variable cost 103 is related to searching for the new session on the SADB (e.g., a WAVL tree, for example) to retrieve session data if a session is already started. FIG. 1B is a graph illustrating a linear interpolation 106 and a logarithmic interpolation 108 of the measured session start cost of FIG. 1A. FIG. 1C is a graph illustrating a linear interpolation 106 and a logarithmic interpolation 108 of the measured session start cost extended to a BNG router with 0<n<256 k started sessions. As shown in FIG. 1C, it is estimated that 46% of the session start execution time is related to the variable cost 103 according to the logarithmic interpolation 108 (342% for the linear interpolation 106) for 256 k sessions. Because the variable cost 103 is related to access/search operations on the WAVL tree, the logarithmic interpolation 108 is likely the better estimate.

Bloom Filters (BFs) have been used in database applications in related art. The structure of a BF is basically that of an array of m bits, each of which is initially set to zero. An element x of the set is represented in the BF by applying K distinct hash functions h1( ) . . . hk( ) to x and setting to 1 the bits at positions h1(x) . . . hk(x) in the array. Because of its randomized and hashing-based mechanism, the price to pay for BF's small memory footprint is the presence of a certain (and known) amount of false positives. For example, when responding to membership queries on a BF (e.g., Is element x in set S?), it is possible to receive a false positive even if the BF returns a positive response. However, it is not possible to receive a false negative. In other words, if a membership query on a BF returns a negative response, the queried element does not belong to the set represented by the BF. In most applications, the advantages of using a BF outweigh the risks of receiving false positives. Additionally, false positives are controllable and occur at a known rate. Specifically, when $$m = \frac{n \times K}{\ln(2)},$$

when where m is the number of bits in the BF, n is the number of elements in the set and K is the number of has functions, the probability of receiving a false positive is defined as $f=2^{-K}$.

Referring now to FIGS. 2A-2B, processes of constructing a BF and performing a lookup using the BF are shown. As shown in FIG. 2A, the process of constructing a BF representing the set of elements {x, y} is shown. Initially, the BF is empty and all of the bits are set to 0. Then, the hash functions (e.g., h1( ), h2( ), h3( )) are computed on element x, and the bits pointed by the arrows are set to 1 based on the result of the hash functions. The hash functions (e.g., h1( ), h2( ), h3( )) are then computed on element y, and the bits pointed by the arrows are set to 1 based on the results of the hash functions. The resulting BF representing the set of elements {x, y} is shown.

In FIG. 2B, the process of performing a lookup using the BF is shown. For example, when searching a BF representing the set of elements {x,y} for element x, the hash functions are computed on element x. A determination is made that all bits pointed by the results of the hash functions (bits 0, 3 and 6, for example) are set to 1. This indicates that element x is a member of the set of elements {x,y}. On the other hand, when searching a BF representing the set of elements {x,y} for element t, the hash functions are computed on element t. The hash functions return bits 1, 4 and 5, for example. Because bits 4 and 5 are set to 0, t is not a member of the set of elements {x,y}. Additionally, when searching a BF representing the set of elements {x,y} for element z, the hash functions return bits 0, 3 and 7, for example. Because bins 0, 3 and 7 are set to 1 but z is not a member of the set of elements {x,y}, a false positive is returned.

BFs, however, fail to support deletion of items from a data set. Thus, Counting Bloom Filters (CBFs) have been developed to provide a way to implement a delete operation on a BF without recreating the BF. In a CBF, the array positions (or bins, buckets, slots, etc.) are extended from being a single bit to an n-bit counter. In fact, regular BFs can be considered as CBFs with a bucket size of one bit. The insert operation is extended to increment the value of the buckets, and the lookup operation checks that each of the required buckets is non-zero. The delete operation includes decrementing the value of each of the respective buckets. The size of counters is typically set to 3 or 4 bits. Hence, CBFs typically use 3 to 4 times more space than regular BFs.

CBFs have been used within a database system called a Shared Fast Hash Table (SFHT), which is discussed in detail in Song et al., *Fast Hash Table Lookup Using Extended Bloom Filter: An Aid to Network Processing*, SIGCOMM '05, Aug. 21-26 (2005). In a SFHT, the CBF is extended in order to also maintain a pointer to a list of elements contained in each CBF bin. Referring now to FIG. 3, an example Shared Fast Hash Table representing elements {x, y, z, w} is shown. The SFHT is a CBF 300 having an array of bins 301 and corresponding pointers 303. The pointers 303 are capable of pointing to a list of elements contained in each of the bins 301, and each of the bins 301 is a counter. In FIG. 3, element x 302, element y 304, element z 306 and element w 308 are inserted into the CBF as discussed above (e.g., compute the hash functions for the element, increment the counter, etc.). Additionally, a pointer 303 is maintained to a list of elements contained by each of the bins 301. As shown in FIG. 3, the elements are not completely shared because element w 308 is duplicated. When a search is executed, the hash functions are computed on the membership query (and assuming all of the bins are non-zero), the search is performed on the list associated with the bin having the lowest counter value.

However, as the number of hash functions and the number of elements in the set of elements increase, the number of collisions increases, which causes performance of a search using the CBF to degrade with respect to a search of the standard database tree (i.e., a WAVL tree).

SUMMARY

Methods and apparatuses for improving database search performance are disclosed herein. For example, in some implementations, the methods and apparatuses use a data node structure that prevents the need to duplicate data nodes shared by a plurality of data trees. Additionally, the methods and apparatus facilitate improved database lookup times by implementing an adaptive presence detection system based on the Bloom Filter, performance characteristics of the computing device and status of the database.

An example method for performing a lookup can include providing a plurality of data nodes, where each data node includes a data section and an array section. The array section can include a plurality of pointers capable of linking each data node to at least one of the data nodes. Additionally, the method can include: providing a plurality of data trees each having at least one of the data nodes; and providing an array having a plurality of bins, where each bin includes a counter indicating a number of data nodes associated the bin and a pointer capable of linking the bin to at least one of the data trees. The method can also include: receiving a lookup request; performing a plurality of hash functions on the lookup request to obtain a plurality of outputs that are associated with bins of the array; identifying the bin associated with each of the outputs; determining whether a counter of the bin associated with each of the outputs is nonzero; identifying the bin having the counter with a lowest value upon determining that the counter of the bin associated with each of the outputs is nonzero; identifying a data tree linked to the bin having the counter with the lowest value; and retrieving an entry corresponding to the lookup request from the identified data tree.

In some implementations, the method can include performing K hash functions on the lookup request. Additionally, the array section of each of the data nodes can include K+1 sets of pointers when K hash functions are computed. For example, each set of pointers in the K+1 sets of pointers can include at least two pointers.

Alternatively or additionally, pointers of at least one set of pointers in the K+1 sets of pointers of one of the data nodes can be set to a memory address of at least one of the data nodes.

In some implementations, the K+1 sets of pointers include a set of pointers associated each of the K hash functions. Additionally, the K+1 sets of pointers can further include a set of pointers associated with a main data tree that comprises each of the data nodes.

In other implementations, the method can include performing the K hash functions on a new entry to obtain K outputs that are associated with bins of the array. If a bin associated with one of the K outputs is zero, the method can include incrementing a counter of the bin and setting a pointer of the bin to a memory address of the new entry. On the other hand, if a bin associated with one of the K outputs is nonzero, the method can include incrementing a counter of the bin and setting a pointer of at least one of the K+1 sets of pointers of one of the data nodes of a data tree linked to the bin to a memory address of the new entry.

In some implementations, the array is a Counting Bloom Filter. Alternatively or additionally, the plurality of data trees are WAVL trees.

Another example method for performing a lookup can include providing a plurality of data nodes, where each data node includes a data section and an array section. The array section can include a plurality of pointers capable of linking each data node to at least one of the data nodes. Additionally, the method can include: providing a plurality of data trees each having at least one of the data nodes and at least one of the data trees having each of the data nodes; and providing an array having a plurality of bins, where each bin includes a counter indicating a number of data nodes associated the bin and a pointer capable of linking the bin to at least one of the data trees. The method can also include: receiving a lookup request; and upon receiving the lookup request, determining a performance characteristic of the computing device. If the performance characteristic is less than a predetermined threshold, the method can include retrieving the lookup requests by performing a plurality of hash functions on the lookup request to obtain a plurality of outputs that are associated with bins of the array; identifying the bin associated with each of the outputs; determining whether a counter of the bin associated with each of the outputs is nonzero; identifying the bin having the counter with a lowest value upon determining that the counter of the bin associated with each of the outputs is nonzero; identifying a data tree linked to the bin having the counter with the lowest value; and retrieving an entry corresponding to the lookup request from the identified data tree. On the other hand, if the performance characteristic is greater than the predetermined threshold, the method can include retrieving the lookup request by retrieving an entry corresponding to the lookup request from the at least one of the data trees including each of the data nodes.

In some implementations, the performance characteristic can include a ratio of a time constant related to performing the K hash functions to a time constant related to retrieving the lookup request from the at least one of the data trees including each of the data nodes.

For example, the performance characteristic can be defined as $$2^{\left(\frac{p \times K}{h}\right)},$$

where p is a time constant related to performing a hash function, K is a number of hash functions and h is a time constant related to retrieving a lookup request from the at least one of the data trees including each of the data nodes.

Additionally, the performance characteristic is less than the predetermined threshold when $$n > 2^{\left(\frac{p \times K}{h}\right)} \text{ and } N > 2^{\left(\frac{p \times K}{h}\right)}$$

and the performance characteristic is greater than the predetermined threshold when $$n < 2^{\left(\frac{p \times K}{h}\right)} \text{ or } N < 2^{\left(\frac{p \times K}{h}\right)}$$

when where p is a time constant related to performing a hash function, K is a number of hash functions, h is a time constant related to retrieving a lookup request from the at least one of the data trees including each of the data nodes, n is a number of the data nodes at a time of receipt of the lookup request and N is a maximum number of possible data nodes.

In some implementations, the array is a Counting Bloom Filter. Alternatively or additionally, the plurality of data trees are WAVL trees.

It should be understood that the above-described subject matter may also be implemented as a computer-controlled apparatus, a computer process, a computing system, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a", "an", "the", include plural referents unless the context clearly dictates otherwise. The term "comprising" and variations thereof as used herein is used synonymously with the term "including" and variations thereof and are open, non-limiting terms. While implementations will be described for improving performance of database searches in packet forwarding devices, it will become evident to those skilled in the art that the implementations are not limited thereto, but are applicable for improving database search performance in other environments.

Figure 4A:
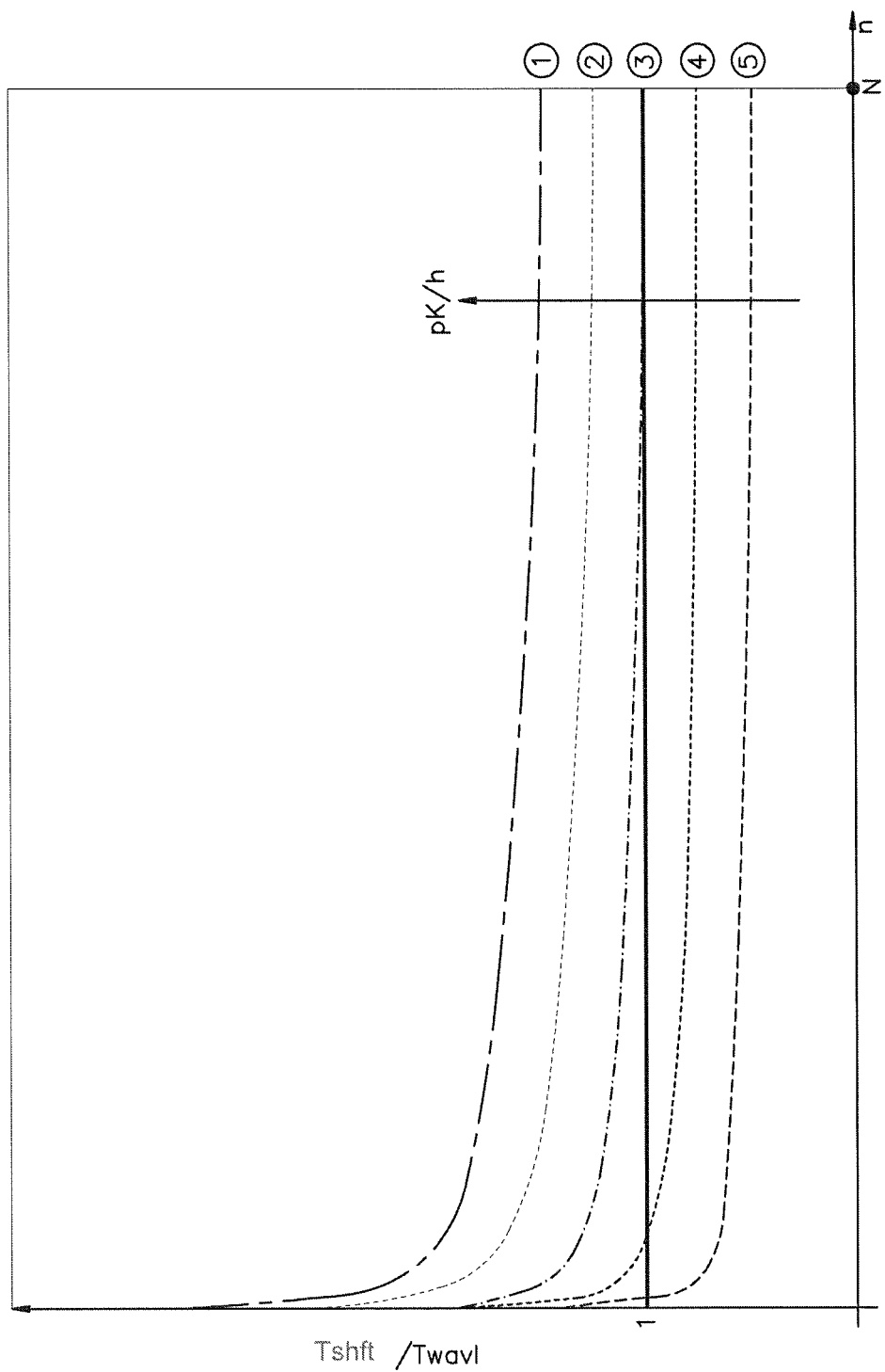
FIGS. 4A-4B are graphs illustrating example relationships between standard WAVL tree searches and SFHT searches.
Figure 4B:
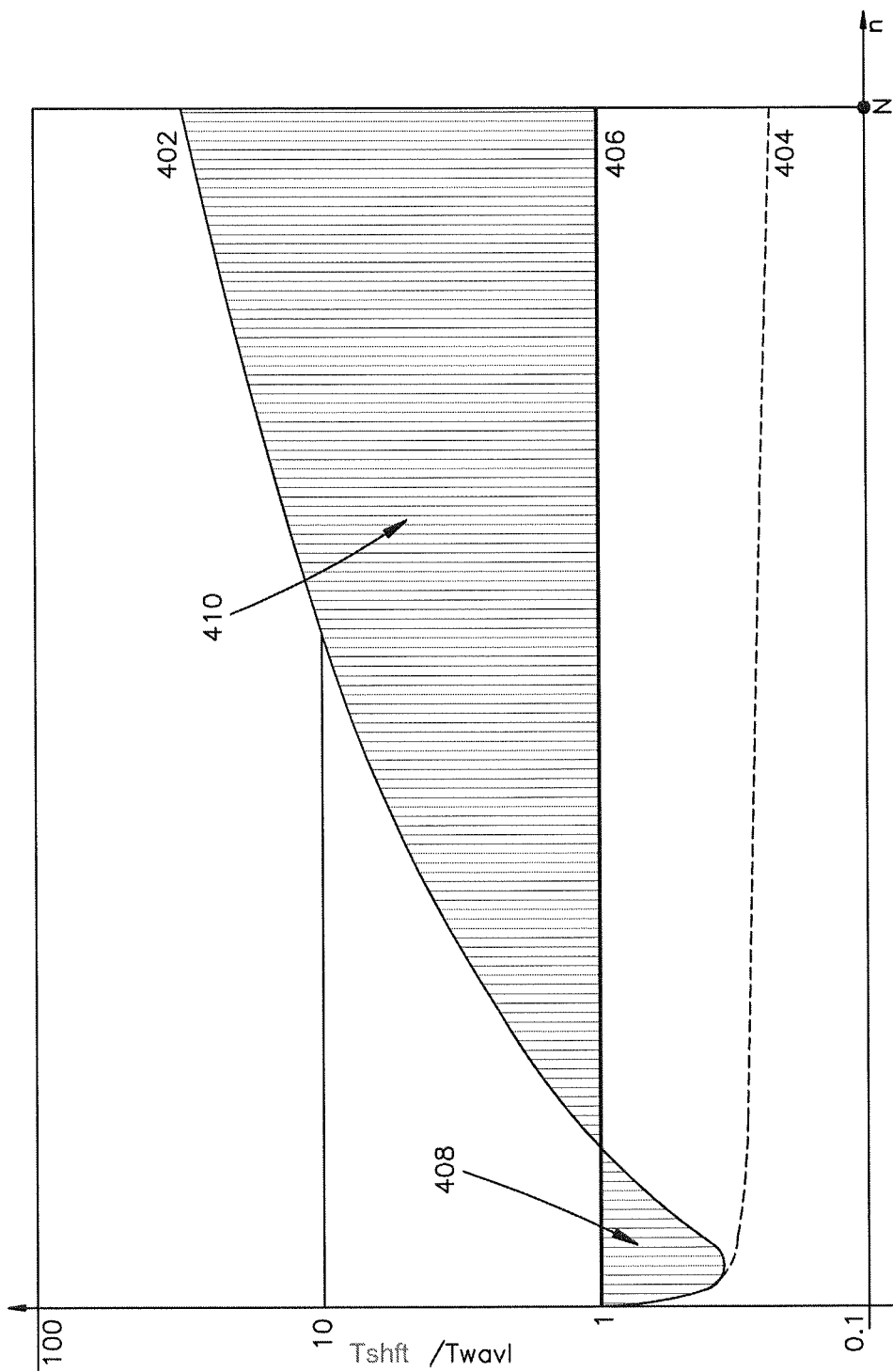

As discussed above, CBFs have previously been used in database applications. For example, SFHTs have been used to improve performance over standard database searches (e.g., standard WAVL tree searches) by reducing the number of memory accesses needed for the most time-consuming lookups. Referring to FIGS. 4A-4B, graphs illustrating example relationships between standard WAVL tree searches and SFHT searches are shown. In FIG. 4A, example best-case time ratios between standard WAVL tree searches and SFHT searches are shown. It should be understood that the search time on a standard WAVL tree can be defined as O(log(n)), and the search time on an SFHT is linear with the number of hash functions. Specifically, the search times on a standard WAVL tree and an SFHT are shown in Eqns. (1) and (2) below.

$$Tw = h \times \log(n) \quad (1)$$

$$Tb = p \times K \quad (2)$$

As discussed herein, N is the maximum number of possible data nodes to be stored and searched in the database; n is the current number of data nodes in the database at run time of the search (e.g., (n ∈ {0, 1, 2 ... N}); Tw(n) is the search time on a standard WAVL tree filled with n elements; Tb(n) is the search time on the SFHT (e.g., a modified CBF); and K is the number of hash functions used for the CBF.

In the best-case scenario, a queried item is available in a 1-length list when searching the SFHT. Assuming that n data nodes are present in the database, if the queried item is present in the database, the search time is Tb seconds. Thus, in the best case, the ratio of the search time using the SFHT to the search time on the standard WAVL tree is defined by Eqn. (3) below.

$$TR_{best}(n) = \frac{T_{SFHT}(n)}{T_{WAVL}(n)} = \frac{T_b}{T_w(n)} = \frac{p \times K}{h \times \log(n)} \quad (3)$$

Accordingly, as shown in FIG. 4A, as the value of $$\frac{p \times K}{h}$$

increases, the search using the SFHT becomes less efficient as compared to the search of the standard WAVL tree. This is shown in curves 1 and 2 of FIG. 4A. On the other hand, as the value of $$\frac{p \times K}{h}$$

decreases, the search using the SFHT becomes more efficient as compared to the search of the standard WAVL tree. This is shown in curves 4 and 5 of FIG. 4A. The value of p×K is related to the time needed to compute the hash functions on the queried item, and h is related to the time needed to perform the WAVL compare function. Thus, as the time to compute the hash functions becomes slow as compared to the time to perform the WAVL compare function, the search of the WAVL tree becomes more efficient than the search using the SFHT. This is shown in FIG. 4A, where curve 3 is the limit between efficient and inefficient SFHT searches.

In the worst-case scenario, a queried item is available in an n-length list when search the SFHT. This is due to the collisions (occurring with a probability of $f=2^{-K}$) that fit within the same bins of the CBF. The time to search an n-length list is defined by Eqn. (4) below.

$$Ti(n) = h \times n \quad (4)$$

Accordingly, in the worst case, the ratio of the search time using the SFHT to the search time on the standard WAVL tree is defined by Eqn. (5) below.

$$TR_{worst}(n) = \frac{\frac{1}{N}\left[NT_b + \frac{n}{2^K}T_l\left(\frac{n}{2^K}\right)\right]}{T_w(n)} = \frac{pK + h\frac{n^2}{N 2^{2K}}}{h \log(n)} = \frac{1}{\log(n)}\left(\frac{pK}{h} + \frac{n^2}{N 2^{2K}}\right) \quad (5)$$

FIG. 4B illustrates example relationships between standard WAVL tree searches and SFHT searches. In FIG. 4B, the best-case SFHT search is shown as 404, the worst-case SFHT search is shown as 402 and the WAVL tree benchmark search is shown as 402. Additionally, the improvement area 408 and overhead area 410 of the worst-case SFHT search 402 are shown. As indicated by FIG. 4B, even though the best-case SFHT search provides advantages (e.g., time cost savings), the worst-case SFHT search performs poorly (e.g., up to 7,500% slower) as compared to the standard WAVL search.

Figure 1A:
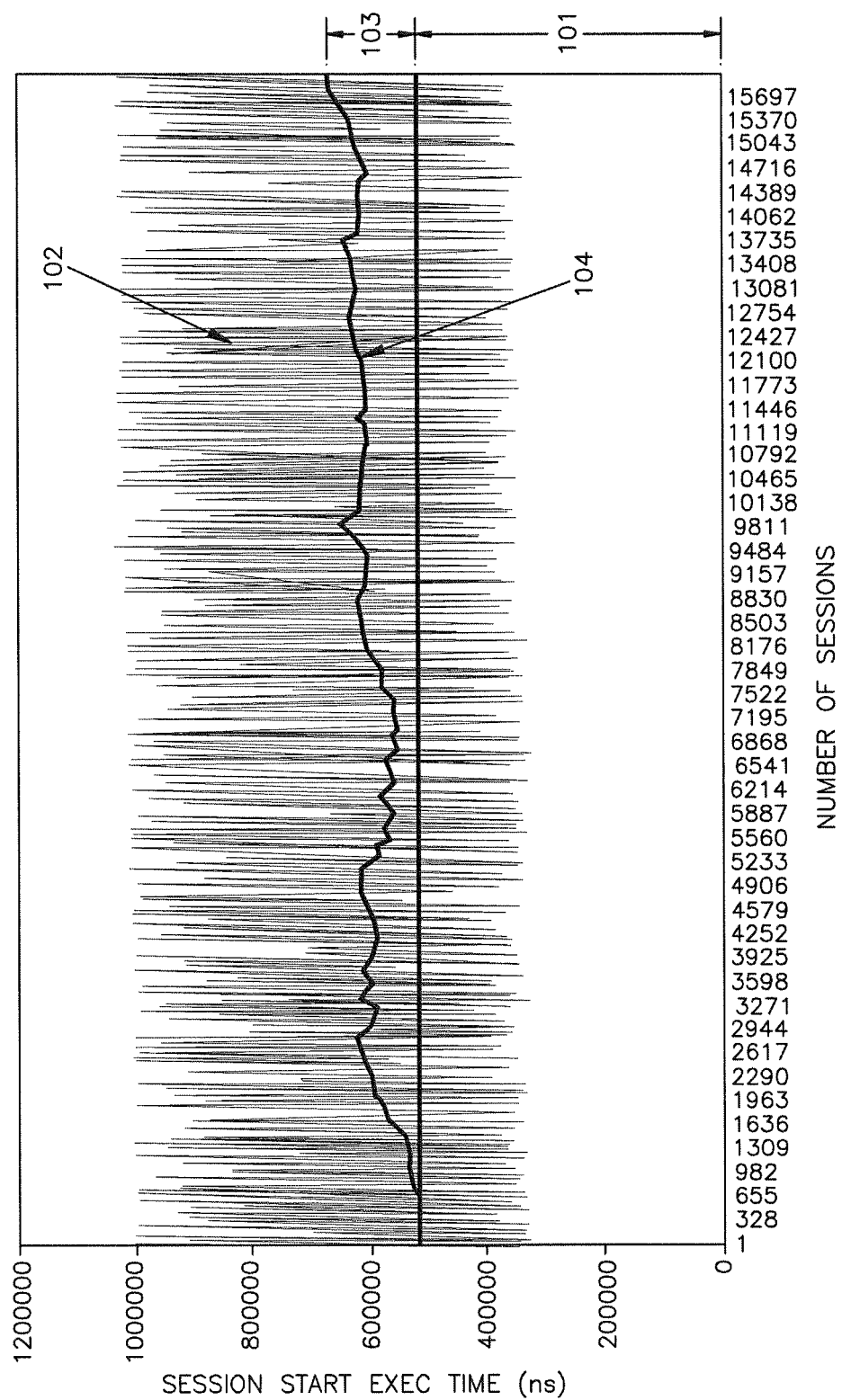
FIG. 1A is a graph illustrating measured session start time cost on an example BNG router.
Figure 1B:
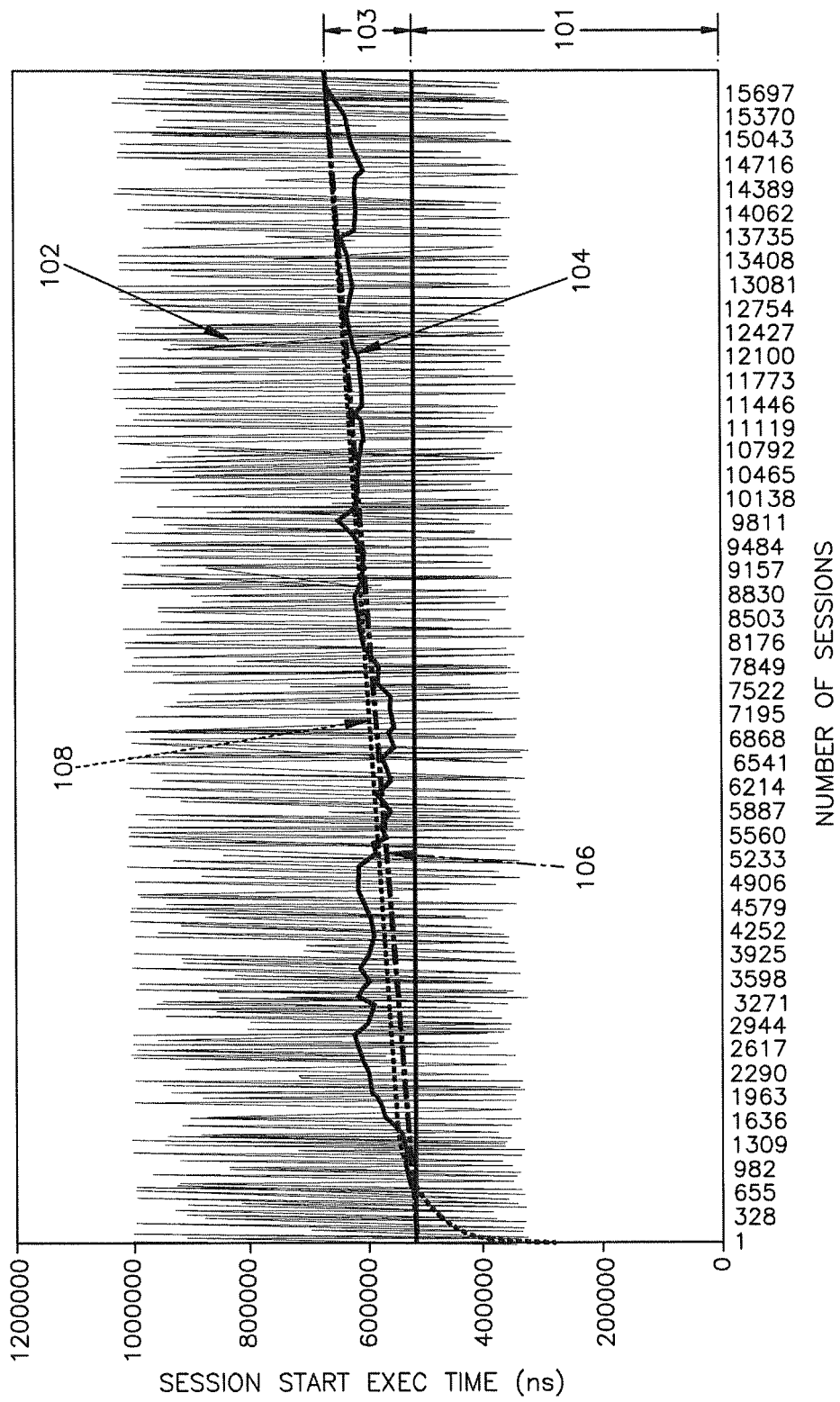
FIGS. 1B-1C are graphs illustrating linear and logarithmic interpolations of the example measured session start time cost on the example BNG router of FIG. 1A.
Figure 1C:
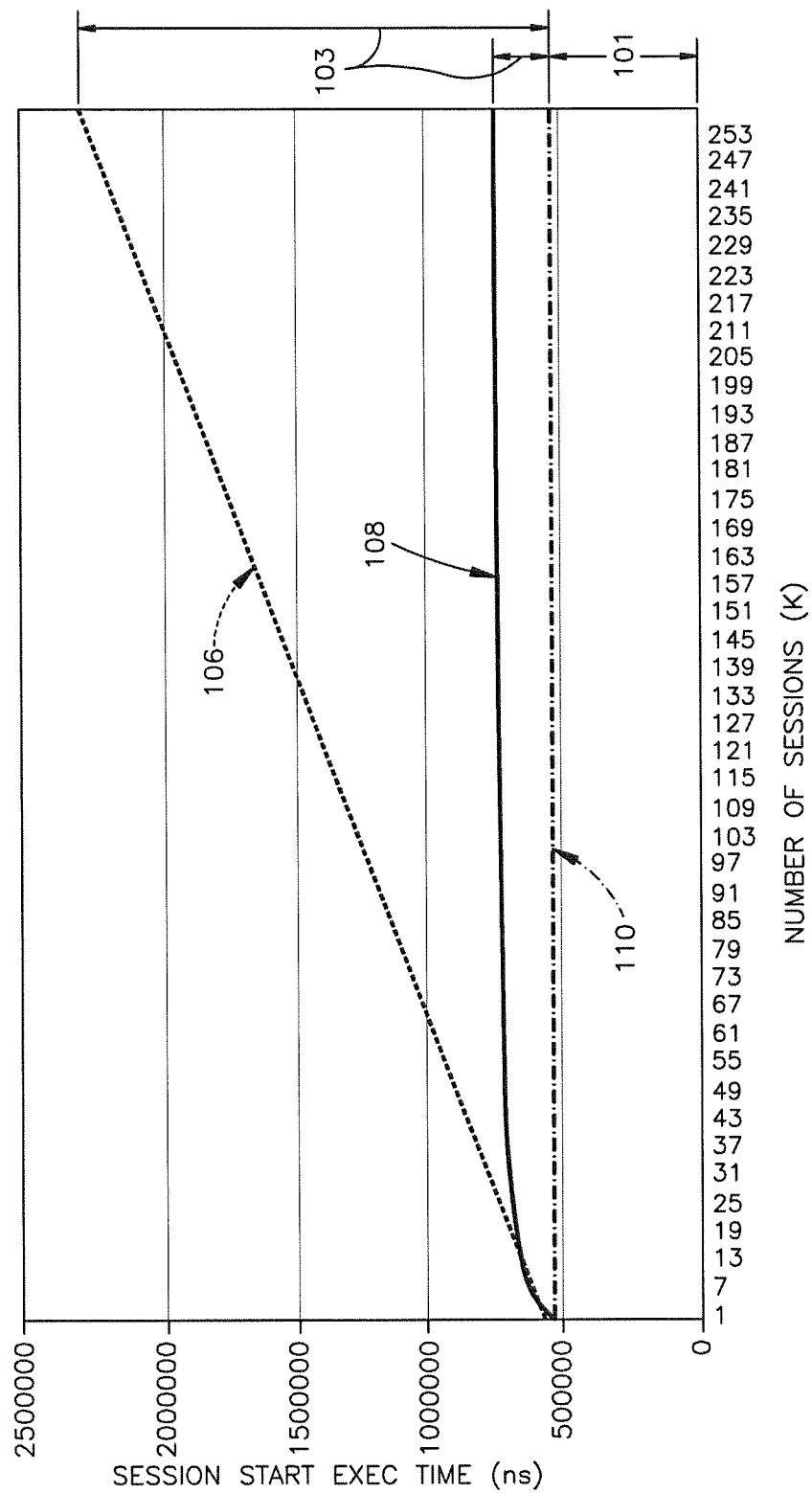
Figure 2A:
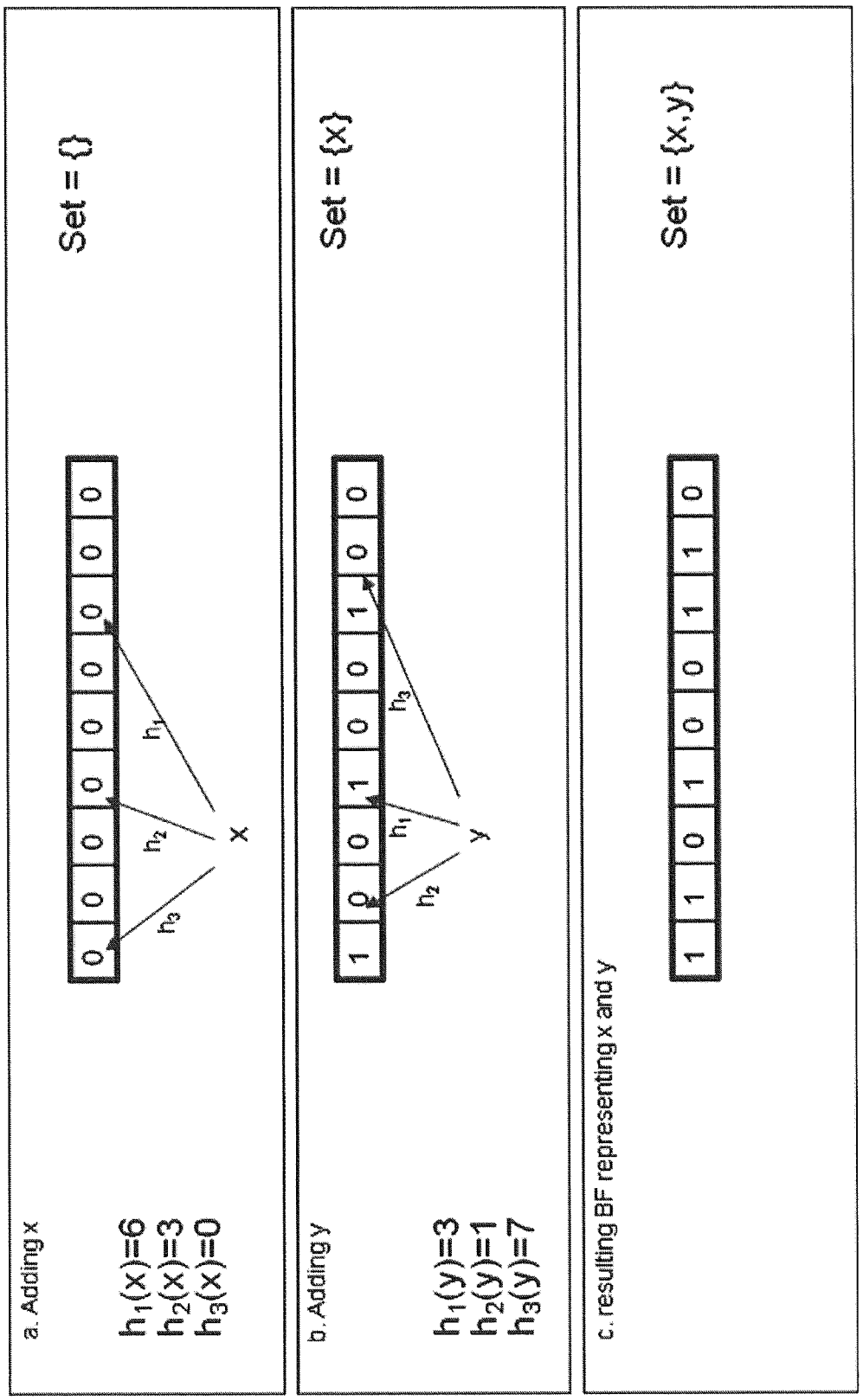
FIGS. 2A-2B are block diagrams illustrating example Bloom Filters.
Figure 2B:
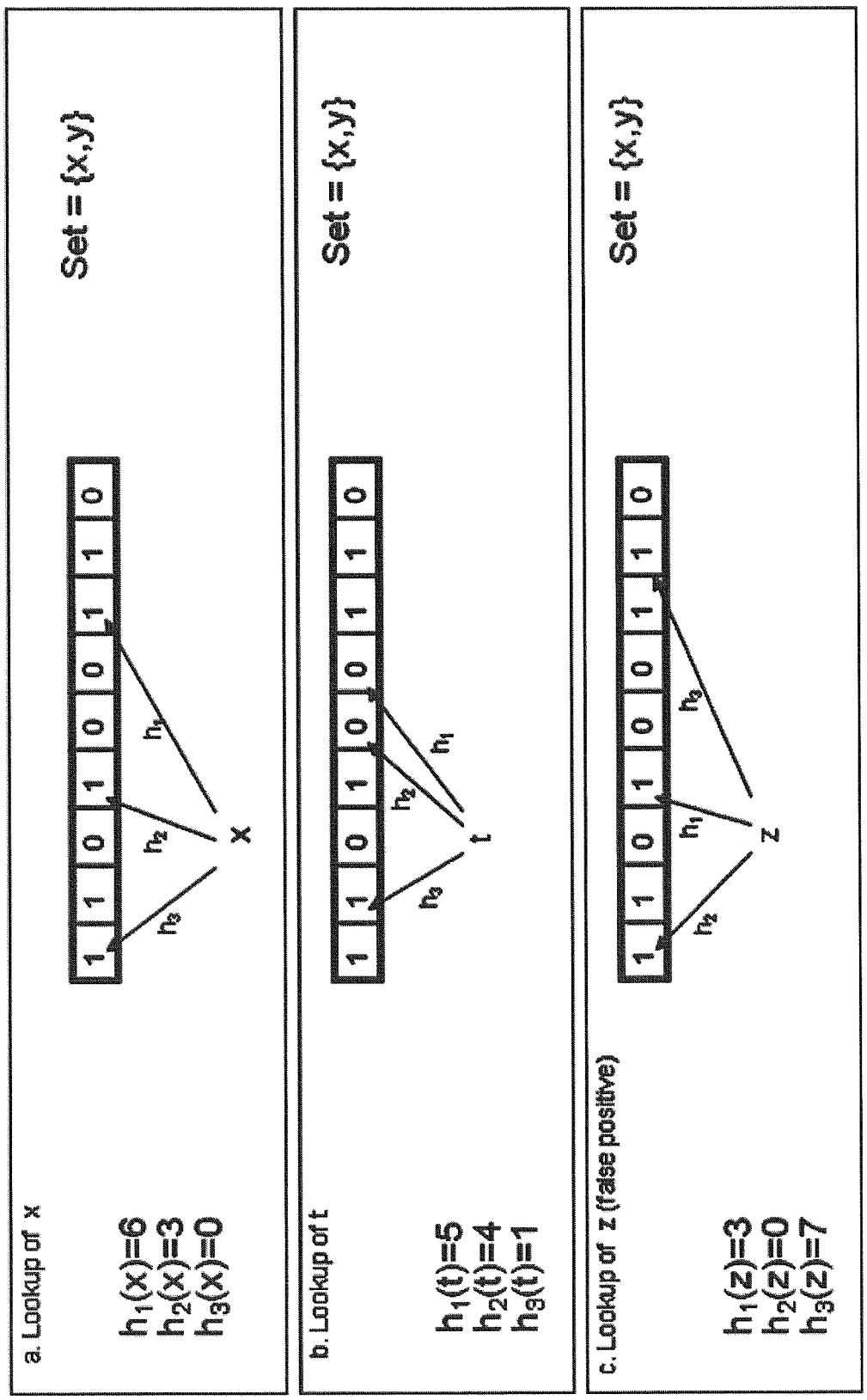
Figure 3:
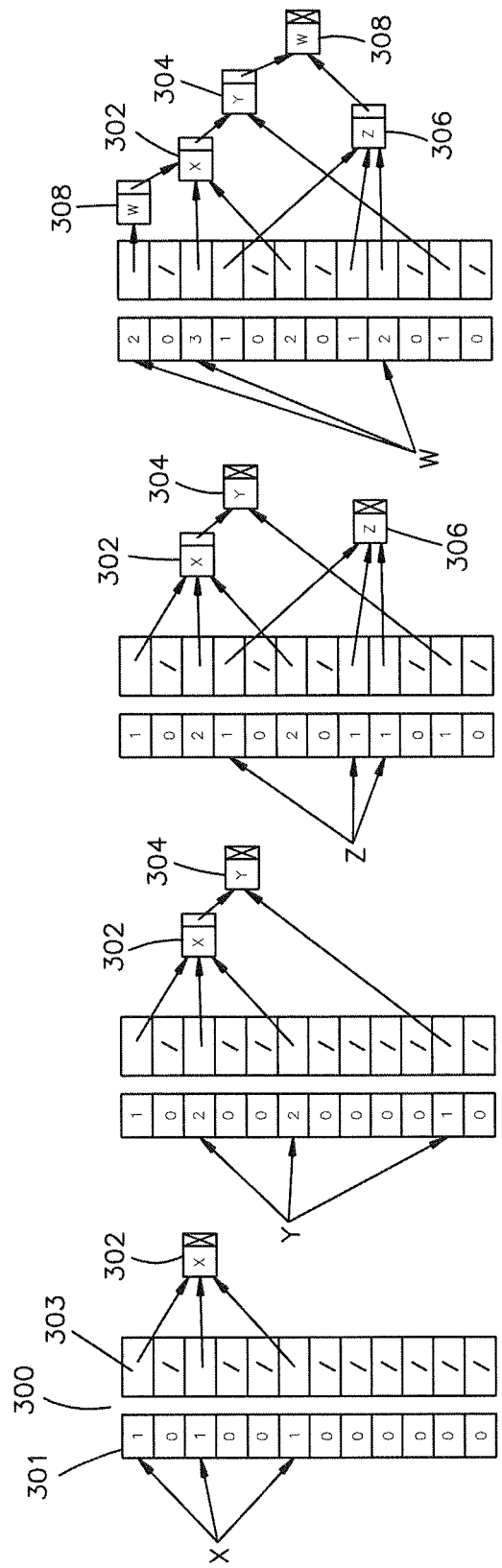
FIG. 3 is a block diagram illustrating an example SFHT.

Thus, the search using the SFHT has several issues. First, even if trying to have shared data nodes among the CBF bins, the sharing is not fully achievable, which produces an overhead in terms of extra memory. For example, as shown in FIG. 3, element w 308 is duplicated. Next, the best-case SFHT does not always perform better than the standard WAVL tree search as shown by curves 1 and 2 of FIG. 4A. Additionally, the worst-case SFHT search often provides poor performance as compared to the standard WAVL tree search as shown in FIG. 4B.

Figure 5:
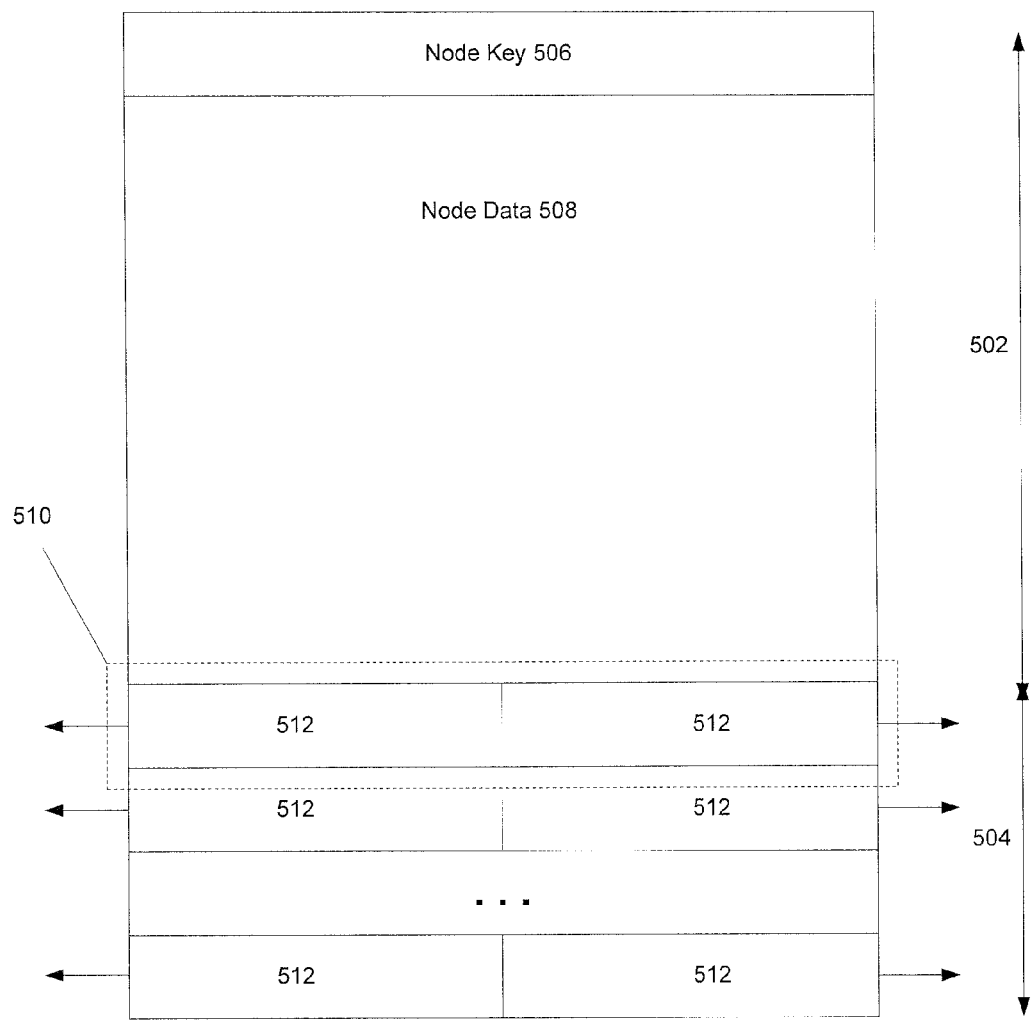
FIG. 5 is a block diagram illustrating an example data node according to implementations discussed herein.

The issue of data node sharing and worst-case performance is partly due the fact that pointed lists are used by the SFHT. Improvements can be realized by using threaded data trees such as threaded WAVL trees. Referring now to FIG. 5, a data structure (e.g., a data node) 500 for use with threaded data trees is shown. The data node 500 includes a data section 502 and an array section 504. The data section 502 includes a node key 506 that is used when searching the database and node data 508, which is the data related to the node key 506. The array section 504 includes a plurality of pointers 512. In some implementations, the array section 504 includes a plurality of sets of pointers 510. For example, as shown in FIG. 5, each set of pointers 510 includes at least two pointers 512. It should be understood that each set of pointers 510 can contain more than two pointers 512. Each set of pointers 510 can include a left pointer and a right pointer, for example, and each set of pointers 510 can identify a data tree such as a WAVL tree. Each set of pointers 510 can optionally identify a different data tree. Additionally, the array section 504 can include K+1 sets of pointers 510, where K is the number of hash functions. When the array section 504 includes K+1 sets of pointers 510, the data node 500 can be shared among K+1 data trees. For example, the data node 500 can be shared by a main data tree that includes each of the plurality of data nodes of the database and a plurality of sub-data trees that include at least one data node. The main data tree including each of the data nodes can include all of the data nodes. Each of the sub-data trees can be one of the K threads used to add entries to the K data trees associated with each CBF bin. As discussed above, each of the data trees can be a WAVL tree, for example.

Figure 6A:
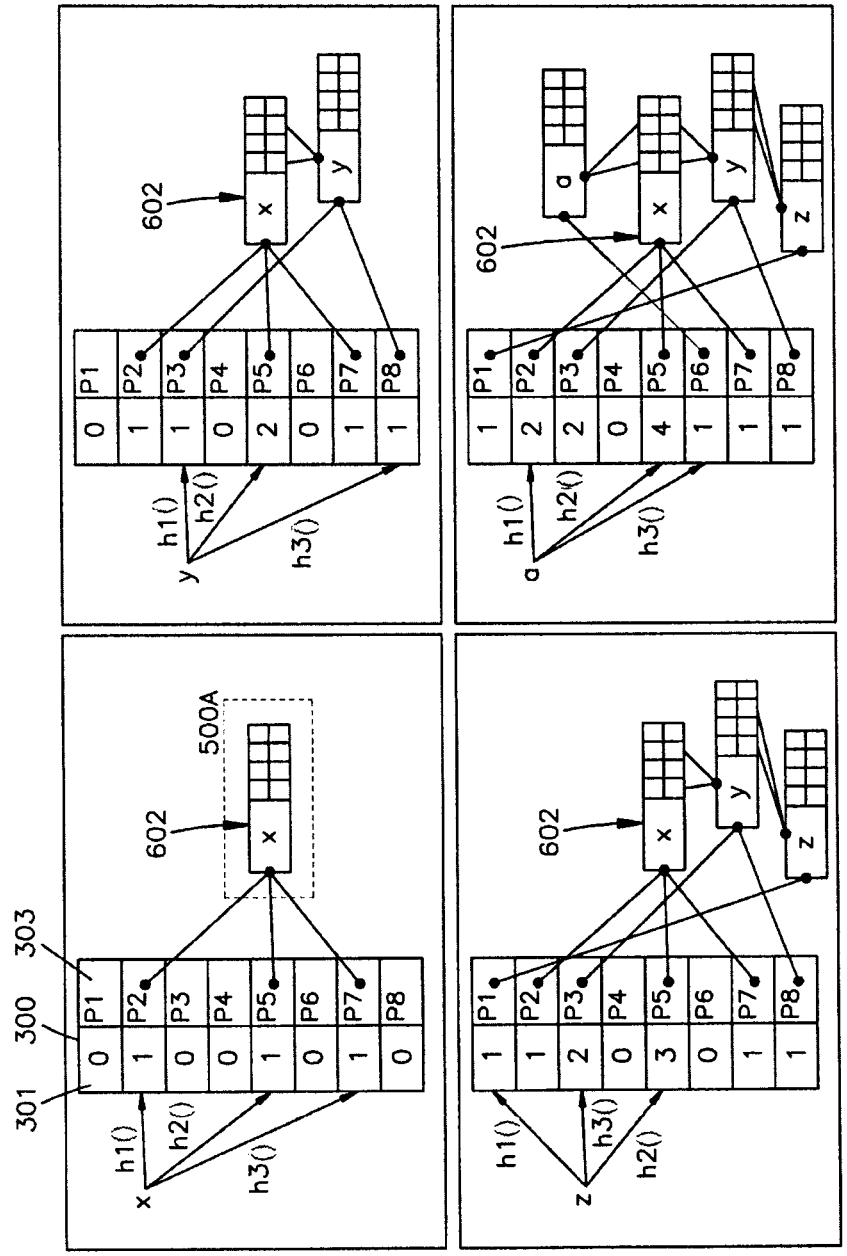
FIG. 6A is a diagram illustrating example operations for inserting a new entry in a CBF according to implementations discussed herein.

Referring now to FIG. 6A, example operations for inserting a new entry are shown. In FIG. 6A, the CBF 300 includes an array of bins 301 and corresponding pointers 303. The pointers 303 are capable of pointing to a list of elements contained in each of the bins 301, and each of the bins 301 is a counter. Additionally, in FIG. 6A, three hash functions (e.g., h1( ), h2( ) and h3( )) are computed for each new entry (i.e., K=3). It should be understood that more or less than three hash functions can be computed for each entry. When the first new entry x is inserted, three hash functions are computed. For example, the outputs of the hash function computations for element x are h1(x)=2, h2(x)=5 and h3(x)=7. After computing each of the hash functions, the corresponding counters 301 are incremented by 1, and the corresponding pointers (i.e., P2, P5 and P7) are set to a memory address related to the entry x. Additionally, a main tree pointer 602 is set to the memory address related to entry x. The reason for setting the main tree pointer 602 to the memory address related to entry x is discussed in detail below.

Figure 6B:
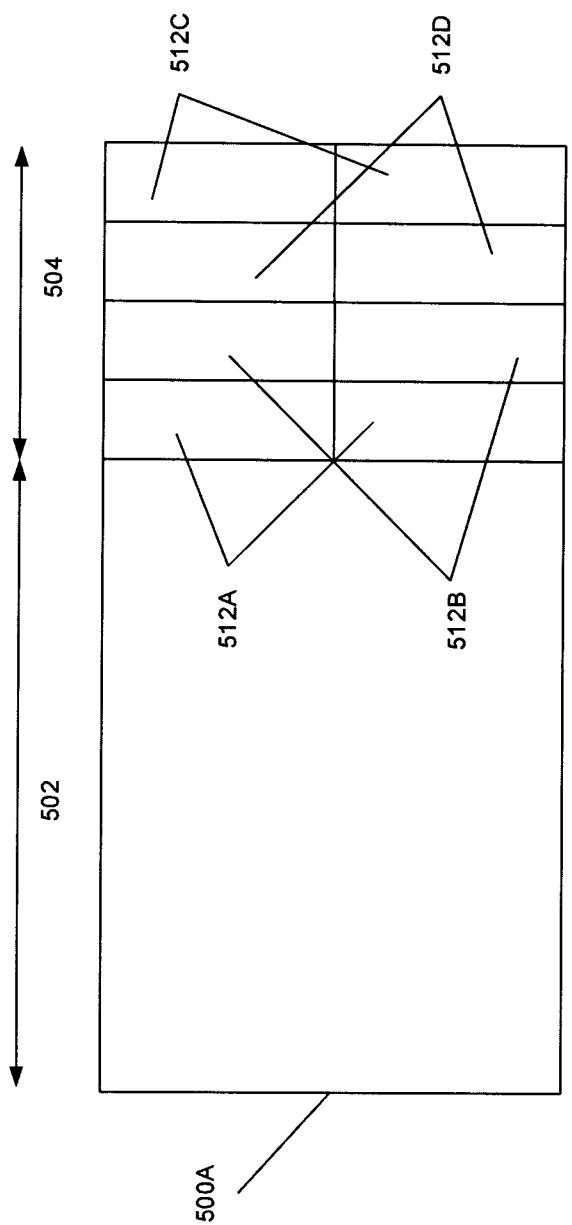
FIG. 6B is a block diagram illustrating an example data node inserted into the CBF of FIG. 6A.

Next, the second new element y is inserted. For example, the three hash functions (e.g., h1( ), h2( ) and h3( )) are computed for each new entry (i.e., K=3). The outputs of the hash function computations for element y are h1(y)=3, h2(y)=5 and h3(y)=8. Because the outputs for h1( ) and h3( ) do not conflict in the CBF 300 (i.e., the corresponding counter values for the bins are 0), the corresponding counters 301 are incremented by 1, and the corresponding pointers (i.e., P3 and P8) are set to a memory address related to the entry y. The output for h2( ) instead is related to a non-zero counter in bin 5. Thus, the corresponding counter 301 is incremented by 1, and a pointer of at least one of the K+1 sets of pointers of one of the data nodes of a data tree linked to the bin to is set to the memory address of entry y. Referring now to FIG. 6B, an example data structure (e.g., a data node) 500A is shown. The data node 500A represents the new entry such as entries x, y, z, a, etc. shown in FIG. 6A. FIG. 6B includes many of the same reference numerals as FIG. 5, and the similar reference numerals are therefore not discussed in more detail below. However, as shown in FIG. 6B, each set of pointers can correspond to a different data tree. For example, pointers 512A can correspond to the main data tree that includes each of the data nodes in the database. As such, pointers 512A are capable of linking the data nodes of the main data tree. The pointers 512A can be referred to as thread 0. Pointers 512B, 512C and 512D can each correspond to the sub-data trees or threads. As such, pointers 512B, 512C and 512D are capable of linking the data nodes of the sub-data trees. The pointers 512B, 512C and 512D can be referred to as threads 1, 2 and 3, respectively. As shown in FIG. 6A, the memory address related to entry y is inserted on the data tree pointed by P5 on thread 2 (i.e., one of the pointers 512C). Additionally, the memory address related to entry y is also inserted on the data tree pointed by P5 on thread 0 (i.e., one of the pointers 512A). Accordingly, new entry y is shared by the main data tree and a sub-data tree.

Figure 7:
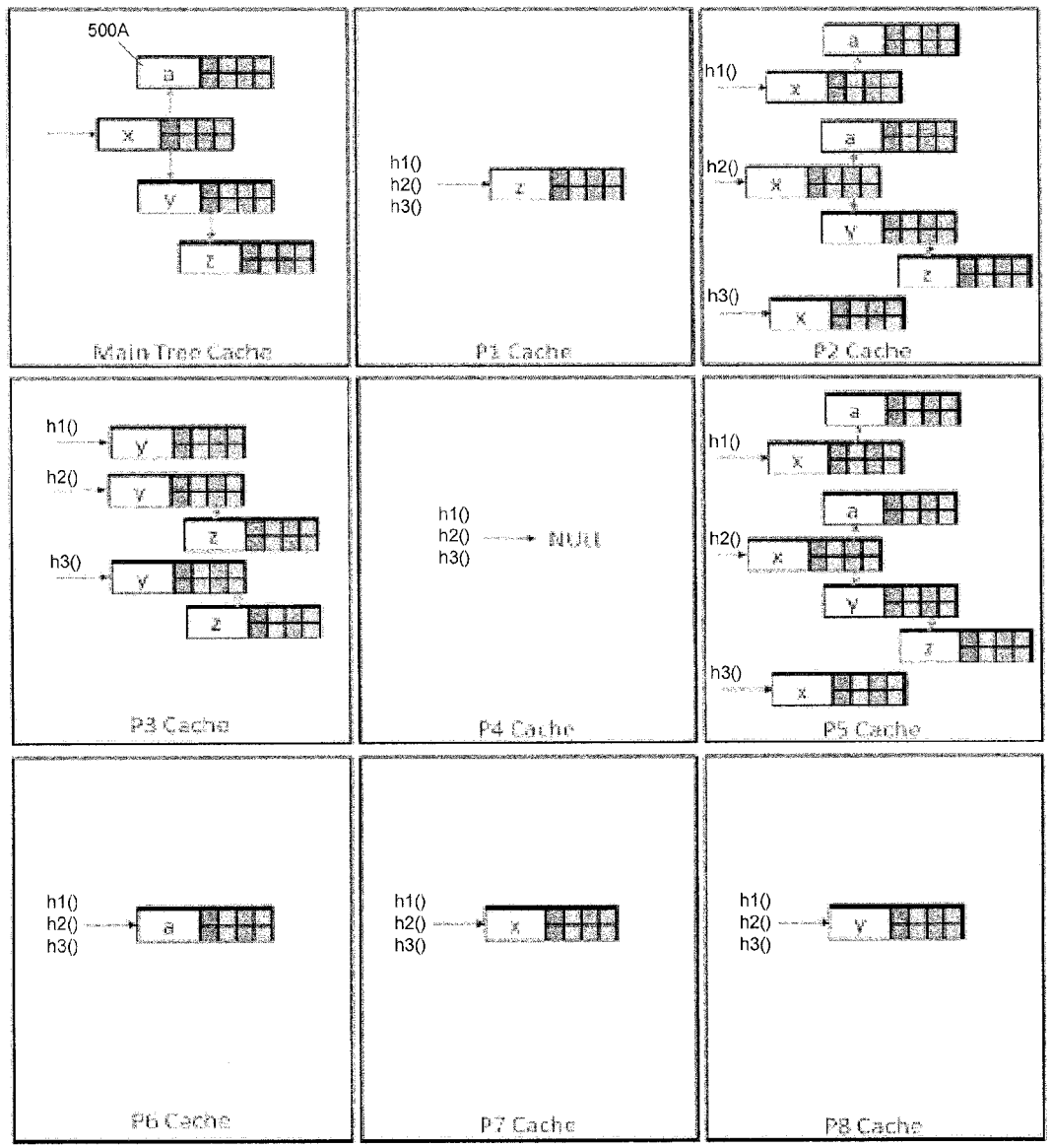
FIG. 7 is a diagram illustrating example data trees associated with the CBF of FIG. 6A.

As shown in FIG. 6A, the same process is repeated for new entries z and a. As a result the entries x, y, z and a are shared by K+1 data trees. Specifically, each of the m bins 301 includes a pointer 303 to a data tree whose search/insert thread is determined by the value of the hash functions applied to the new entry. Referring now to FIG. 7, example data trees available on the database are shown. It should be understood that FIG. 7 is only one example. In some implementations, the data trees can contain more or fewer data nodes than shown in FIG. 7. For example, in some implementations, in the average case, each of the data trees will include only a single data node.

Figure 8:
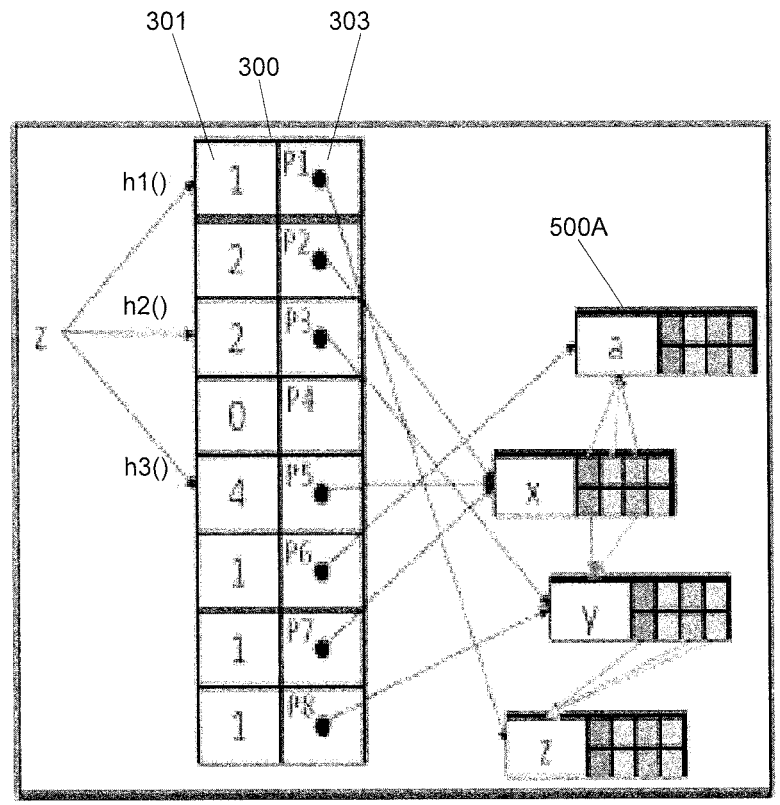
FIG. 8 is a diagram illustrating example operations for searching for an entry in the CBF of FIG. 6A.

Referring now to FIG. 8, example operations for searching for an entry are shown. FIG. 8 shows the CBF 300 including the bins 301 and corresponding pointers 303 after entries x, y, z and a are inserted as discussed above with regard to FIG. 6A. For example, assuming that entry z is searched, the three hash functions (i.e., h1( ), h2( ) and h3( )) are computed for entry z. The output of the hash functions can be CBF[h1(z)]=1, CBF[h2(z)]=4 and CBF[h3(z)]=2. As shown in FIG. 8, there is one bin 301 in the CBF 300 (i.e., CBF[h1(z)]) associated with a data tree including one data node (i.e., entry z). The other bins 301 of the CBF 303 (i.e., CBF[h2(z)] and CBF[h3(z)]) are associated with data trees including more than one data node. Therefore, the data related to entry z is searched and retrieved from the data tree associated with the bin 301 of the CBF 300 having the lowest counter value (i.e., counter=1).

Figure 9A:
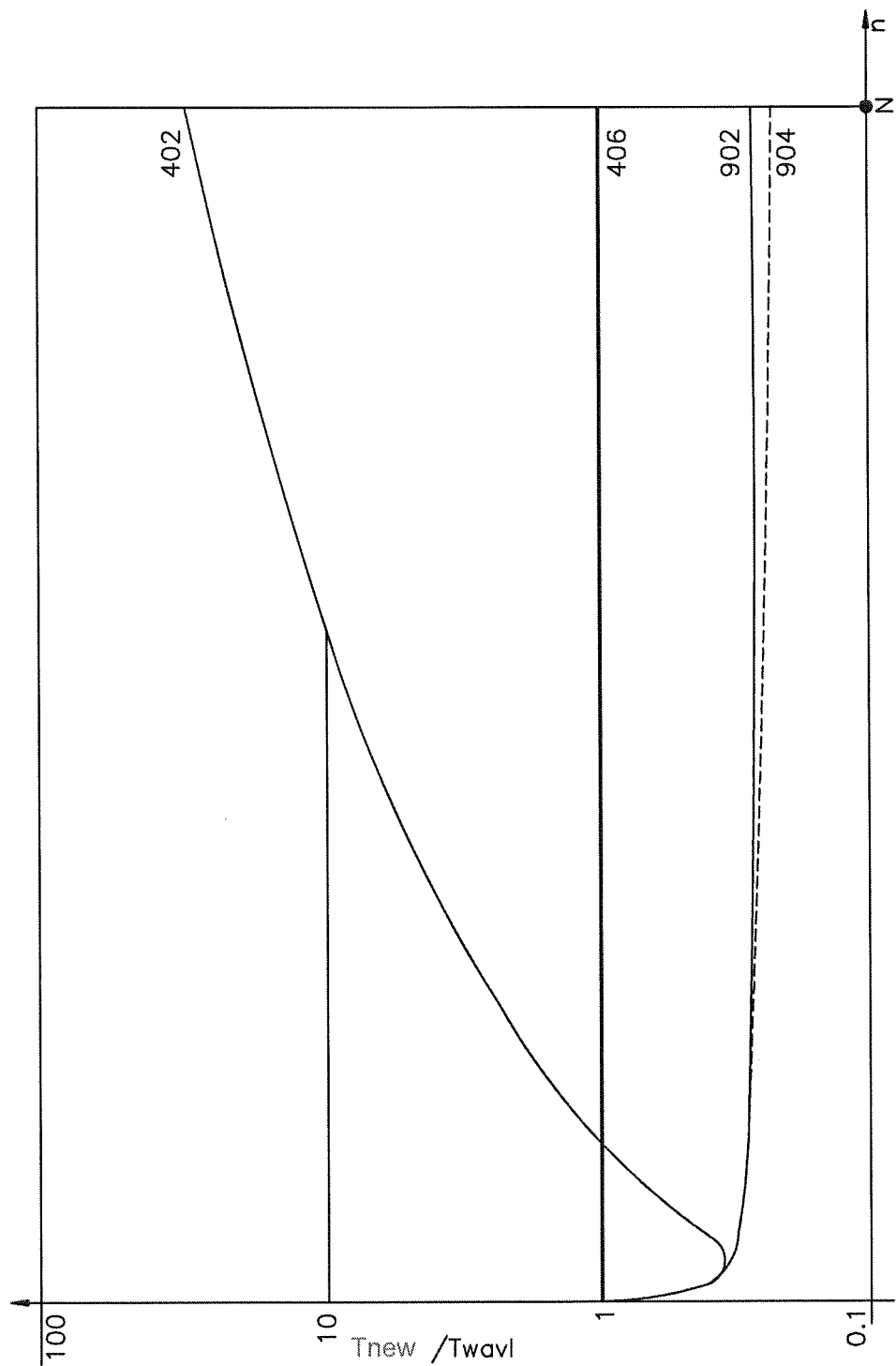
FIGS. 9A-9B are graphs illustrating example relationships between standard WAVL tree searches and search of the data trees associated with the CBF of FIG. 6A.
Figure 9B:
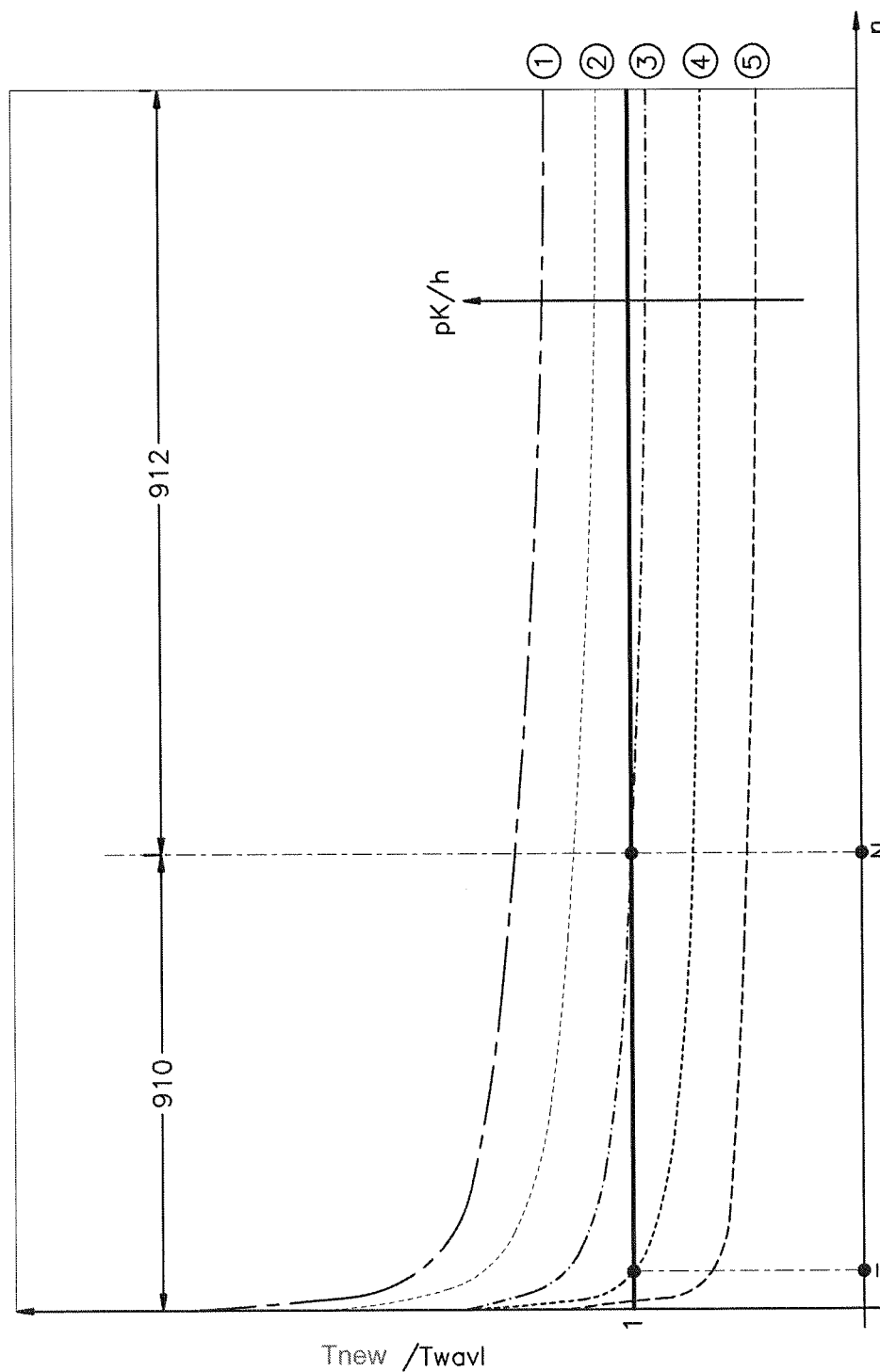

Referring now to FIGS. 9A-9B, graphs illustrating example relationships between standard WAVL tree searches and searches of the data trees discussed in FIGS. 6A-8 are shown. As discussed herein, databases including nodes 500 and the data trees discussed in FIG. 6A-8 are referred to as the new system. Assuming the worst-case scenario where collisions occur on the same bins of the CBF, the ratio of the search time on the new system to the search time on the standard WAVL tree is defined by Eqn. (6) below.

$$\frac{T_{new}(n)}{T_{WAVL}(n)} = \frac{\frac{1}{N}\left[NT_b + \frac{n}{2^K}T_w\left(\frac{n}{2^K}\right)\right]}{T_w(n)} = \qquad (6)$$

$$\frac{pK + \frac{n}{2^K}h\log\left(\frac{n}{2^K}\right)}{h\log(n)} = \frac{pK}{h\log(n)} + \frac{n}{N2^K}\frac{\log\left(\frac{n}{2^K}\right)}{\log(n)}$$

Although the ratio in Eqn. (6) above diverges for n→+∞, it should be understood that Eqn. (6) is valid over a range n ∈ {0, 1, 2 . . . N}. As shown in FIG. 9A, the worst-case new system search 902 and the best-case new system search 904 are shown in relation t the worst-case SFHT search 402 and the WAVL benchmark search 406. Based on FIG. 9A, even the worst-case new system search 902 performs better than the worst-case SFHT search 402. Additionally, there is not a large difference between the worst-case new system search 902 and the best-case new system search 904.

FIG. 9B, similarly to the search using the SFHT illustrated in FIG. 4A, illustrates that in some scenarios even the best-case new system search performance may be worse that the standard WAVL tree search. This is particularly the case when the value of $$\frac{p \times K}{h}$$

increases. For example, FIG. 9B shows example relationships between times to perform the new system search and the standard WAVL tree search for different values of $$\frac{p \times K}{h}.$$

In FIG. 9B, $\bar{n}$ is the value of n for which the ratio between the time to perform the new system search and the standard WAVL tree search $$\left(i.e., \frac{T_{new}(n)}{T_{WAVL}(n)}\right)$$

is 1. When $\bar{n}$>N (e.g., region 912), the new system search (as well as the search using the SFHT shown in FIG. 4A) performs worse than the standard WAVL tree search. This is shown by curves 1 and 2 of FIG. 9B. On the other hand, when n>$\bar{n}$ and $\bar{n}$<N (i.e., region 910), the new system search performs better than the standard WAVL tree search. This is shown by curves 4 and 5 of FIG. 9B.

In the best case, the ratio of the search time on the new system to the search time on the standard WAVL tree is defined by Eqn. (7) below.

$$TR_{best}(n) = \frac{T_{new}(n)}{T_{WAVL}(n)} = \frac{T_b}{T_w(n)} = \frac{p \times K}{h \times \log(n)} \qquad (7)$$

Additionally, if $\bar{n}$ is such that $TR_{best}(\bar{n})=1$, then $$\bar{n}(p, k, K) = 2^{\frac{p \times K}{h}}.$$

Therefore, as discussed in detail below, at the time of the search (i.e., at run time), the above information can be used to determine whether to perform the new system search or the standard WAVL tree search. When the determination is made to perform the standard WAVL tree search, the main data tree including each of the data nodes can be searched. As discussed above, the main data tree including each of the data nodes is maintained even when all of the data nodes are shared among a plurality of sub-data trees.

At run time, a determination can be made as to whether to perform the standard WAVL tree search or the new system search. This determination can be made based on one or more performance characteristics of a computing device that performs the search. The performance characteristic can be calculated at boot time of the computing device and/or at run time of the search. In some implementations, the computing device is a packet forwarding device such as a router, for example. It should be understood that the computing device is not limited to the packet forwarding device and can be any other type of computing device. For example, if the performance characteristic is less than a predetermined threshold, then the new system search can be executed. In this case, the new system search is predicted to perform better than the standard WAVL search. If, however, the performance characteristic is greater than the predetermined threshold, then the standard WAVL tree search can be executed. In this case, the new system search is predicted to perform worse than the standard WAVL tree search.

In some implementations, the performance characteristic is defined as $$2^{(\frac{p \times K}{h})},$$

where p is a time constant related to performing a hash function, K is a number of hash functions and h is a time constant related to retrieving a lookup request from the main data tree including each of the data nodes. Additionally, p and h are time constants related to the computing device and can be calculated at run time of the search. Alternatively or additionally, time constants p and h can be calculated at boot time of the computing device. When time constants p and h are calculated at boot time, the time constants can be used in future calculations. Alternatively, time constants p and h can be recalculated at run time. For example, n and N are known at run time, and a training sequence of M data nodes can be used in order to calculate the time constants p and h using Eqn. (8) and (9) below.

$$p = \frac{\sum_{i=1}^{M} T_b(i)}{MK} \qquad (8)$$

$$h = \frac{2}{M} \sum_{i=\frac{M}{2}}^{M} \frac{T_w(i)}{\log(i)} \qquad (9)$$

Because p, h, K and N are known at boot time and n is known at run time, the determination as to whether to perform the new system search or the standard WAVL tree search is adaptive. The adaptive algorithm can be defined as shown in Eqn. (10) below.

$$CBF(n, p, h, K, N) = \begin{cases} \text{TRUE,} & \text{if } n > 2^{\frac{p \times K}{h}} \text{ and } N > 2^{\frac{p \times K}{h}} \\ \text{FALSE,} & \text{otherwise} \end{cases} \qquad (10)$$

Figure 10:
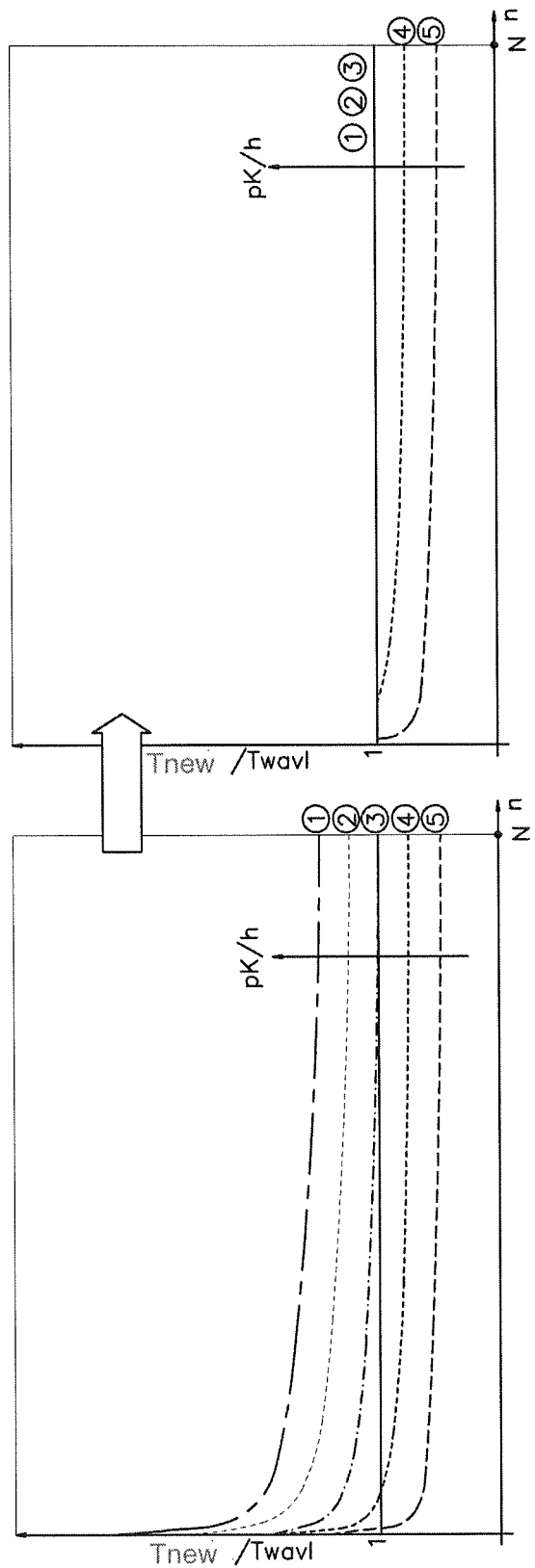
FIG. 10 is a graph illustrating the relationship between standard WAVL tree searches and searches of the data trees of FIG. 9B after application of an adaptive algorithm.

Therefore, it is possible to avoid the degradation in performance of the new system search with respect to a standard WAVL tree search. As shown in FIG. 10, a graph illustrating the relationship between standard WAVL tree searches and the new system searches after application of the adaptive algorithm is shown in relation to a graph illustrating the relationship between standard WAVL tree searches and the new system searches of FIG. 9B. By using the adaptive algorithm, it is possible to reduce database lookup times by implementing an adaptive presence detection system based on BF, performance characteristics evaluated at run time and status of the database. As shown in FIG. 10, the standard WAVL search is performed if the new system search is predicted to perform worse than the standard WAVL search.

Figure 11:
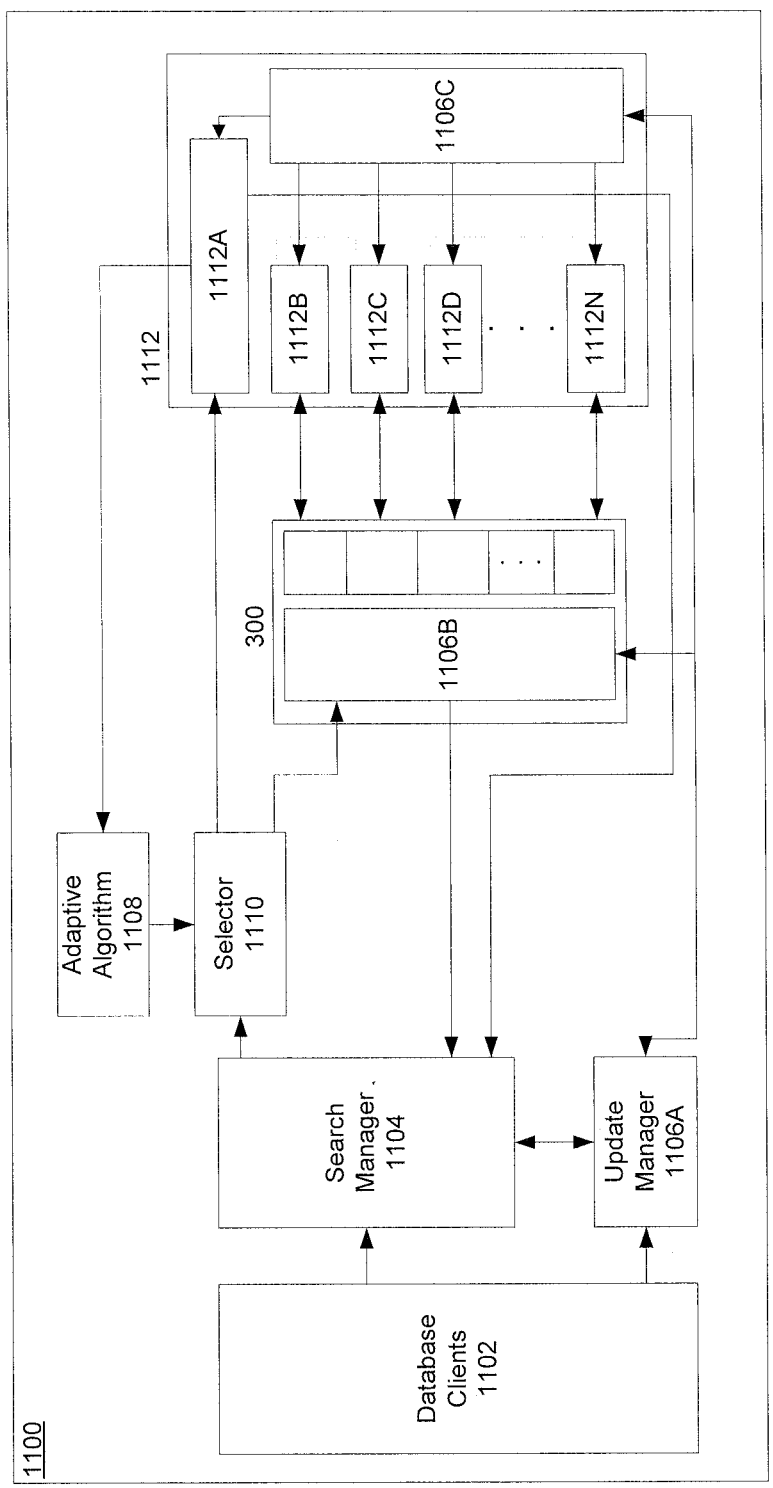
FIG. 11 is a block diagram illustrating a system for performing an adaptive algorithm for selecting a search technique.

Referring now to FIG. 11, a system 1100 for implementing the adaptive algorithm is shown. The system 1100 includes database clients 1102, a CBF 300 and a database 1112. The database 1112 includes a plurality of data nodes. The data nodes can be the data node discussed with regard to FIG. 5. Additionally, the database 1112 can include a plurality of data trees 1112A, 1112B, 1112C, 1112D . . . 1112N. For example, the data tree 1112A can be a main data tree including each of the data nodes. The data nodes 1112B, 1112C, 1112D . . . 1112N can be data trees including at least one data node. For example, the data nodes 1112B, 1112C, 1112D . . . 1112N can be the data trees associated with the threads that share data nodes as discussed above. The system 1100 can also include a search manager 1104 configured to coordinate search requests. Additionally, the system 1100 can include an update manager 1106A, a CBF update manager 1106B and a database update manager 1106C configured to coordinate updates (e.g., insert/delete entries from the database, the data trees and/or the CBF).

The system 1100 also includes a selector 1110 and an adaptive algorithm 1108 that provide the selection criteria in order to select between the standard WAVL tree search in the database or the CBF processing. For example, when the search manager 1104 receives a search request for an item, the request is forwarded to the selector 1110. Depending on the status of the adaptive algorithm 1108, the search is executed on the main data tree 1112A or one of the sub-data trees 1112B, 1112C, 1112D . . . 1112N managed by the CBF 300. After the item is retrieved from either the main data tree 1112A or one of the sub-data trees 1112B, 1112C, 1112D . . . 1112N, the item is returned to the search manager 1104. Additionally, if an update request is received from the database clients 1102, the update manager 1106A coordinates with the CBF update manager 1106B and the database update manager 1106C to update the database, data trees and/or CBF.

Figure 12:
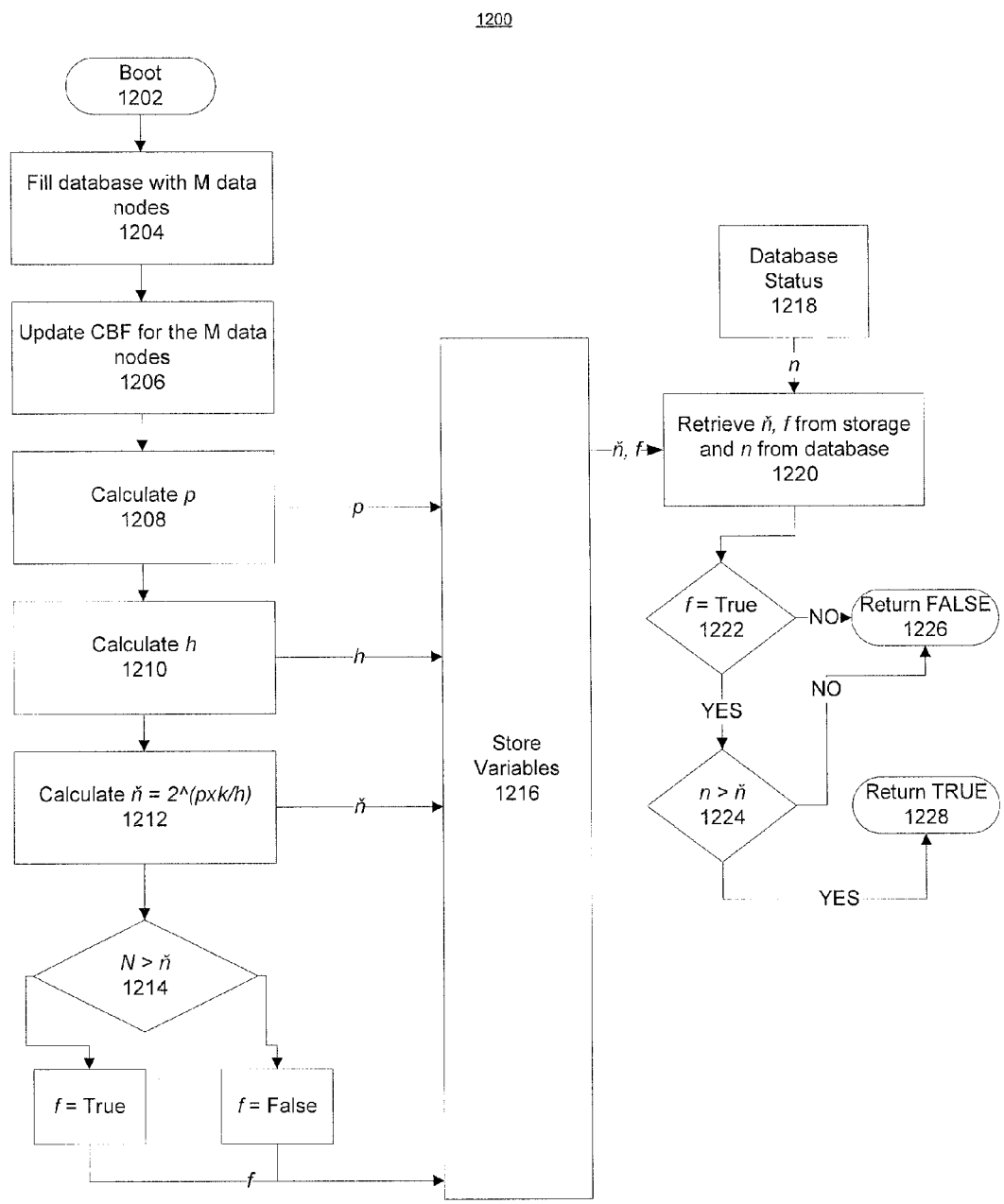
FIG. 12 is a flow diagram illustrating example operations for performing the adaptive algorithm.

Referring now to FIG. 12, a flow diagram 1200 illustrating example operations for performing the adaptive algorithm are shown. At 1202, the computing device is booted. After booting the computing device, in order to calculate time constants p and h, the database is filled with M dummy data nodes at 1204. At 1206, the CBF is updated with the M data nodes. Thereafter, at 1208 and 1210, time constants p and h are calculated. At 1212, the performance characteristic, which is defined as $$2^{(\frac{p \times K}{h})},$$

is calculated. Then, at 1214 a determination is made as to whether the maximum number of possible data nodes (i.e., N) is greater than $$2^{(\frac{p \times K}{h})}.$$

If YES, the variable f is set as TRUE. If NO, the variable f is set as FALSE. At 1216, p, h, $$2^{\left(\frac{p \times K}{h}\right)}$$

and f are stored.

At run time (i.e., the time a lookup request is received), the database status is determined. For example, at 1218, a number of data nodes (i.e., n) in the database is determined. Thereafter, at 1220, the value of $$2^{\left(\frac{p \times K}{h}\right)}$$

and f are retrieved from storage, and the value of n is retrieved from the database. At 1222, a determination is made as to whether f is TRUE. If NO, FALSE is returned at 1226, and the standard WAVL tree search is conducted. If YES, the operations proceed to 1224 where a determination is made as to whether $$n > 2^{\left(\frac{p \times K}{h}\right)}.$$

If NO, FALSE is returned at 1226, and the standard WAVL tree search is conducted. On the other hand, if YES, TRUE is returned at 1228, and the new system search is conducted (e.g., a search of one of the sub-data trees managed by the CBF).

It should be appreciated that the logical operations described herein with respect to the various figures may be implemented (1) as a sequence of computer implemented acts or program modules (i.e., software) running on a computing device, (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 13:
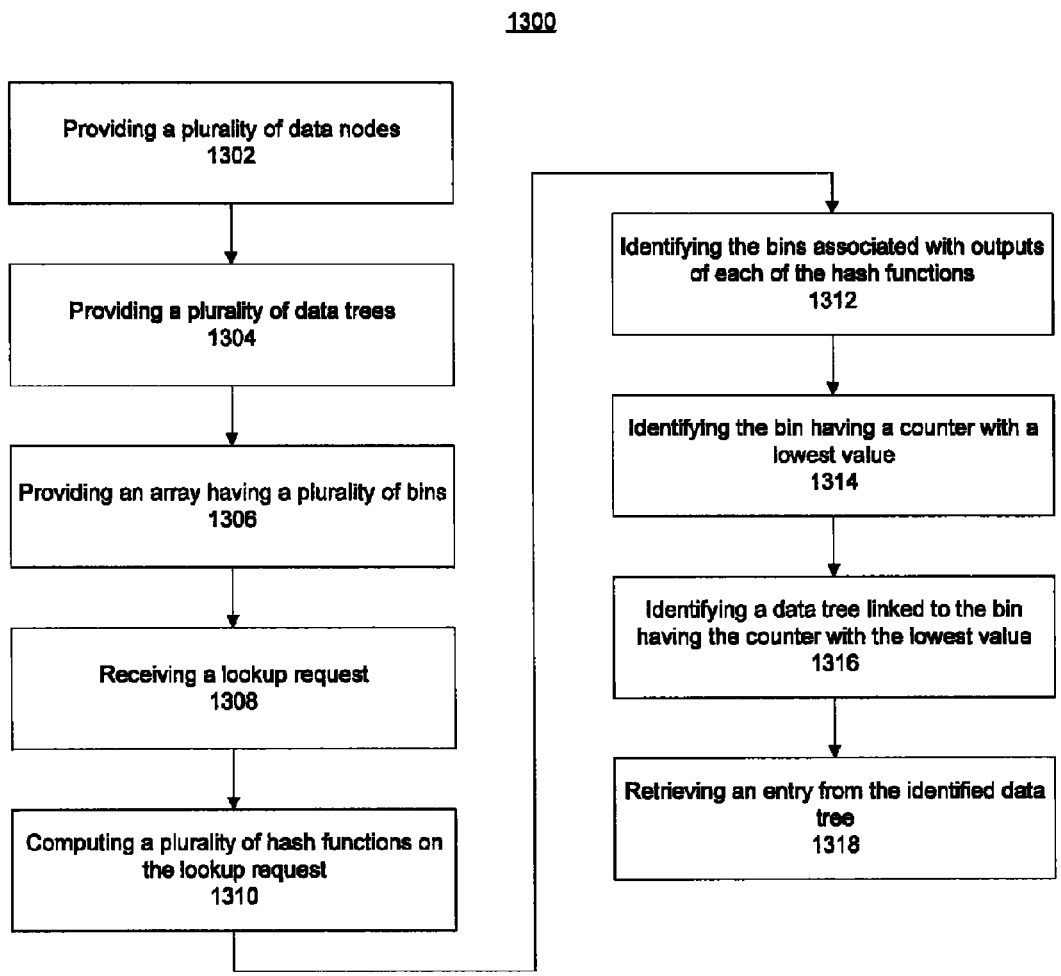
FIG. 13 is a flow diagram illustrating example operations for performing a lookup according to implementations discussed herein.

Referring now to FIG. 13, a flow diagram 1300 illustrating example operations for performing a lookup are shown. At 1302, a plurality of data nodes are provided. The data nodes can optionally be the data node 500 discussed with regard to FIG. 5. At 1304, a plurality of data trees can be provided. Each data tree includes at least one of the data nodes. At 1306, an array having a plurality of bins is provided. Each of the bins includes a counter indicating a number of data nodes associated the bin and a pointer capable of linking the bin to at least one of the data trees. For example, in some implementations, the array can be a CBF. At 1308, a lookup request is received. Then, at 1310, a plurality of hash functions are computed on the lookup request to obtain outputs of the hash functions. Each of the outputs can be associated with one of the bins of the array. At 1312, the bins associated with each of the outputs of the hash functions are identified. At 1314, the bin having a counter with a lowest value among the bins associated with each of the outputs is identified. Then, a data tree linked to the bin having a counter with a lowest value is identified at 1316. An entry is retrieved from the identified data tree at 1318.

Figure 14:
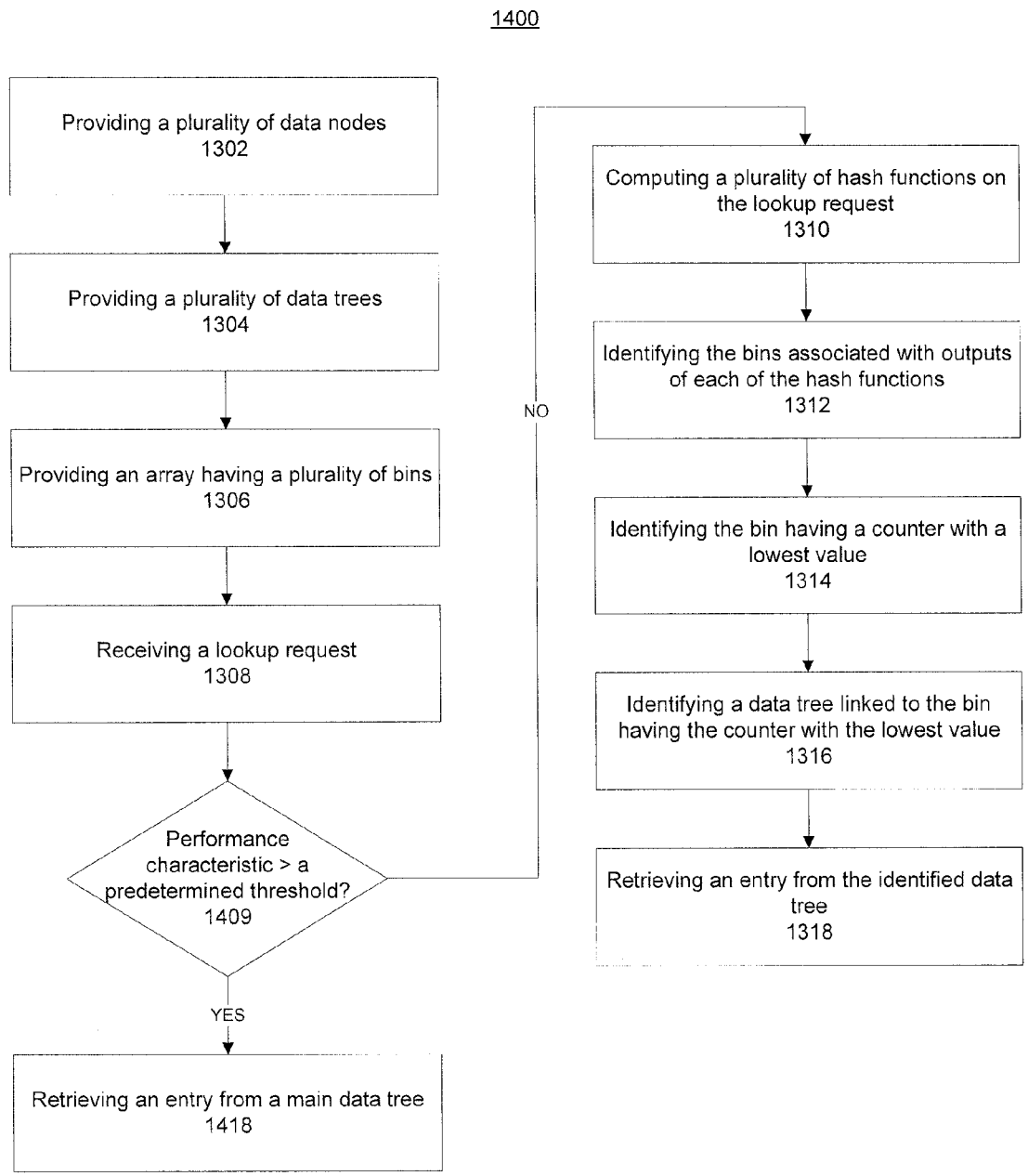
FIG. 14 is another flow diagram illustrating example operations for performing a lookup according to implementations discussed herein.

Referring now to FIG. 14, a flow diagram 1400 illustrating example operations for performing a lookup are shown. FIG. 14 includes a number of the same operations that are discussed above with regard to FIG. 13. The similar operations are identified by the same reference numerals, and these operations are not discussed in further detail below. As shown in FIG. 14, a lookup request is received at 1308. Upon receiving the lookup request, a determination is made as to whether a performance characteristic is greater than a predetermined threshold at 1409. If NO, the operations proceed to steps 1310-1318, and an entry is retrieved from one of the sub-data trees as discussed above. If YES, the operations proceed to step 1420, and an entry is retrieved from a main data tree. When the performance characteristic exceeds the predetermined threshold, performance of the search of the sub-data trees (e.g., using the CBF) is predicted to be worse than the standard WAVL search. Accordingly, using an adaptive algorithm, it is possible to improve database lookup times by implementing an adaptive presence detection system based on the Bloom Filter, performance characteristics of the computing device evaluated at run time and status of the database.

Figure 15:
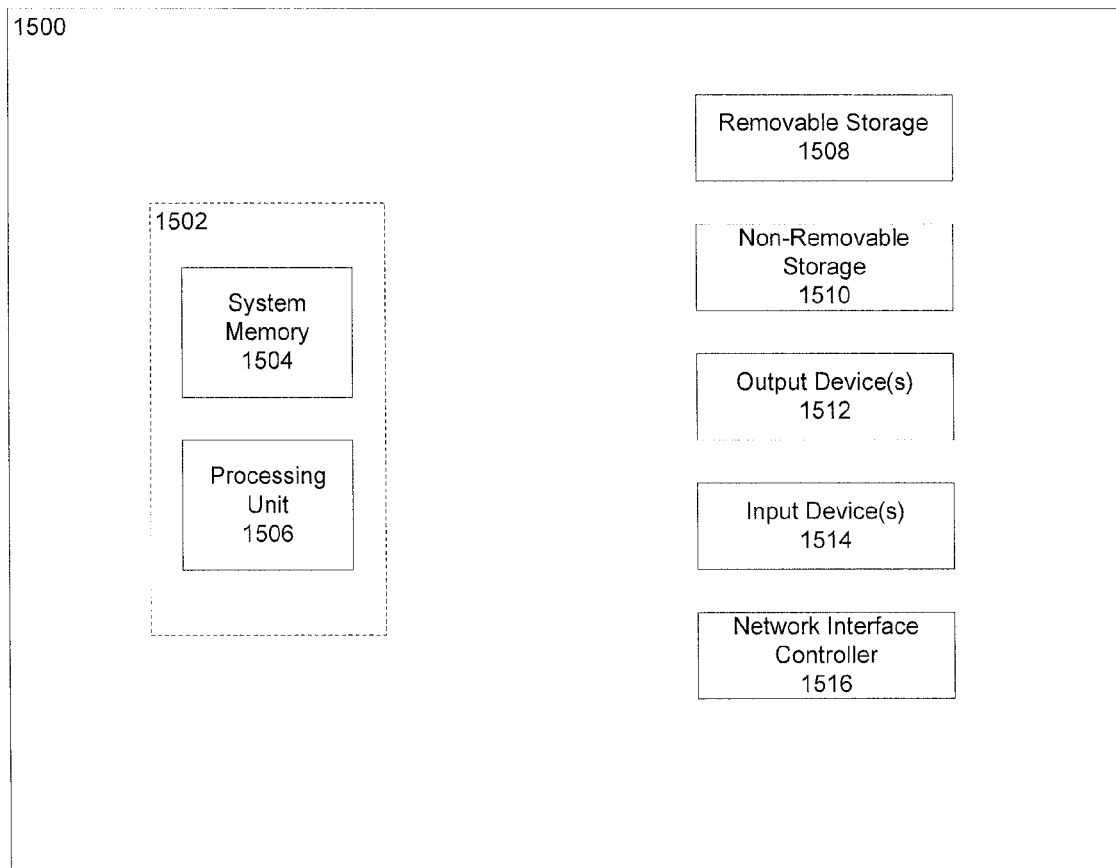
FIG. 15 is an example computing device.

When the logical operations described herein are implemented in software, the process may execute on any type of computing architecture or platform. For example, referring to FIG. 15, an example computing device upon which embodiments of the invention may be implemented is illustrated. In particular, the packet forwarding device discussed above may be a computing device, such as computing device 1500 shown in FIG. 15. The computing device 1500 may include a bus or other communication mechanism for communicating information among various components of the computing device 1500. In its most basic configuration, computing device 1500 typically includes at least one processing unit 1506 and system memory 1504. Depending on the exact configuration and type of computing device, system memory 1504 may be volatile (such as random access memory (RAM)), non-volatile (such as read-only memory (ROM), flash memory, etc.), or some combination of the two. This most basic configuration is illustrated in FIG. 15 by dashed line 1502. The processing unit 1506 may be a standard programmable processor that performs arithmetic and logic operations necessary for operation of the computing device 1500.

Computing device 1500 may have additional features/functionality. For example, computing device 1500 may include additional storage such as removable storage 1508 and non-removable storage 1510 including, but not limited to, magnetic or optical disks or tapes. Computing device 1500 may also contain network connection(s) 1516 that allow the device to communicate with other devices. Computing device 1500 may also have input device(s) 1514 such as a keyboard, mouse, touch screen, etc. Output device(s) 1512 such as a display, speakers, printer, etc. may also be included. The additional devices may be connected to the bus in order to facilitate communication of data among the components of the computing device 1500. All these devices are well known in the art and need not be discussed at length here.

The processing unit 1506 may be configured to execute program code encoded in tangible, computer-readable media. Computer-readable media refers to any media that is capable of providing data that causes the computing device 1500 (i.e., a machine) to operate in a particular fashion. Various computer-readable media may be utilized to provide instructions to the processing unit 1506 for execution. Common forms of computer-readable media include, for example, magnetic media, optical media, physical media, memory chips or cartridges, a carrier wave, or any other medium from which a computer can read. Example computer-readable media may include, but is not limited to, volatile media, non-volatile media and transmission media. Volatile and non-volatile media may be implemented in any method or technology for storage of information such as computer readable instructions, data structures, program modules or other data and common forms are discussed in detail below. Transmission media may include coaxial cables, copper wires and/or fiber optic cables, as well as acoustic or light waves, such as those generated during radio-wave and infra-red data communication. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 1506 may execute program code stored in the system memory 1504. For example, the bus may carry data to the system memory 1504, from which the processing unit 1506 receives and executes instructions. The data received by the system memory 1504 may optionally be stored on the removable storage 1508 or the non-removable storage 1510 before or after execution by the processing unit 1506.

Computing device 1500 typically includes a variety of computer-readable media. Computer-readable media can be any available media that can be accessed by device 1500 and includes both volatile and non-volatile media, removable and non-removable media. Computer storage media include volatile and non-volatile, and removable and non-removable media implemented in any method or technology for storage of information such as computer readable instructions, data structures, program modules or other data. System memory 1504, removable storage 1508, and non-removable storage 1510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1500. Any such computer storage media may be part of computing device 1500.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for performing a lookup, comprising:
providing a plurality of data nodes, each data node comprising a data section and an array section, the array section comprising a plurality of pointers capable of linking each data node to at least one of the data nodes;
providing a plurality of data trees, each data tree including at least one of the data nodes;
providing an array having a plurality of bins, each bin comprising a counter indicating a number of data nodes associated with the bin and a pointer capable of linking the bin to at least one of the data trees;
receiving a lookup request;
performing a plurality of hash functions on the lookup request to obtain a plurality of outputs, each of the outputs being associated with a bin;
identifying the bin associated with each of the outputs;
determining whether a counter of the bin associated with each of the outputs is nonzero;
upon determining that the counter of the bin associated with each of the outputs is nonzero, identifying the bin having the counter with a lowest value;
identifying a data tree linked to the bin having the counter with the lowest value; and retrieving an entry corresponding to the lookup request from the identified data tree.

2. The method of claim 1, further comprising performing K hash functions on the lookup request, wherein the array section of each of the data nodes further comprises K+1 sets of pointers.

3. The method of claim 2, further comprising:
performing the K hash functions on a new entry to obtain K outputs, each of the K outputs being associated with a bin;
if a bin associated with one of the K outputs is zero, incrementing a counter of the bin and setting a pointer of the bin to a memory address of the new entry; and
if a bin associated with one of the K outputs is nonzero, incrementing a counter of the bin and setting a pointer of at least one of the K+1 sets of pointers of one of the data nodes of a data tree linked to the bin to a memory address of the new entry.

4. The method of claim 1, wherein each set of pointers in the K+1 sets of pointers comprises at least two pointers.

5. The method of claim 4, wherein pointers of at least one set of pointers in the K+1 sets of pointers of one of the data nodes are set to a memory address of at least one of the data nodes.

6. The method of claim 5, wherein the K+1 sets of pointers further comprise a set of pointers associated with a main data tree that comprises each of the data nodes.

7. The method of claim 4, wherein the K+1 sets of pointers further comprise a set of pointers associated with each of the K hash functions.

8. The method of claim 1, wherein the array is a Counting Bloom Filter.

9. The method of claim 1, wherein the plurality of data trees are AVL trees.

10. A method for performing a lookup, comprising:
providing a plurality of data nodes, each data node comprising a data section and an array section, the array section comprising a plurality of pointers capable of linking each data node to at least one of the data nodes;
providing a plurality of data trees, each data tree including at least one of the data nodes, at least one of the data trees including each of the data nodes;
providing an array having a plurality of bins, each bin comprising a counter indicating a number of data nodes associated with the bin and a pointer capable of linking the bin to at least one of the data trees;
receiving a lookup request at a computing device;
upon receiving the lookup request, determining a performance characteristic of the computing device;
if the performance characteristic is less than a predetermined threshold, retrieving the lookup requests comprises:
performing K hash functions on the lookup request to obtain K outputs, each of the outputs being associated with a bin;
identifying the bin associated with each of the K outputs;
determining whether a counter of the bin associated with each of the K outputs is nonzero;
upon determining that the counter of the bin associated with each of the K outputs is nonzero, identifying the bin having the counter with a lowest value;
identifying a data tree linked to the bin having the counter with the lowest value; and
retrieving an entry corresponding to the lookup request from the identified data tree, and if the performance characteristic is greater than the predetermined threshold, retrieving the lookup request comprises:
retrieving an entry corresponding to the lookup request from the at least one of the data trees including each of the data nodes.

11. The method of claim 10, wherein the performance characteristic includes a ratio of a time constant related to performing the K hash functions to a time constant related to retrieving the lookup request from the at least one of the data trees including each of the data nodes.

12. The method of claim 11, wherein the performance characteristic is defined as $$2^{(\frac{p \times K}{h})}$$

where p is a time constant related to performing a hash function, K is a number of hash functions and h is a time constant related to retrieving a lookup request from the at least one of the data trees including each of the data nodes.

13. The method of claim 12, wherein the performance characteristic is less than the predetermined threshold when $$n > 2^{(\frac{p \times K}{h})} \text{ and } N > 2^{(\frac{p \times K}{h})},$$

and the performance characteristic is greater than the predetermined threshold when $$n < 2^{(\frac{p \times K}{h})} \text{ or } N < 2^{(\frac{p \times K}{h})},$$

where p is a time constant related to performing a hash function, K is a number of hash functions, h is a time constant related to retrieving a lookup request from the at least one of the data trees including each of the data nodes, n is a number of the data nodes at a time of receipt of the lookup request and N is a maximum number of possible data nodes.

14. The method of claim 10, wherein the array is a Counting Bloom Filter.

15. The method of claim 10, wherein the plurality of data trees are AVL trees.

16. A packet forwarding device, comprising:
a processing unit; and
a memory communicatively connected to the processing unit, the memory being configured to store:
a plurality of data nodes, each data node comprising a data section and an array section, the array section comprising a plurality of pointers capable of linking each data node to at least one of the data nodes;
a plurality of data trees, each data tree including at least one of the data nodes, at least one of the data trees including each of the data nodes; and
an array having a plurality of bins, each bin comprising a counter indicating a number of data nodes associated with the bin and a pointer capable of linking the bin to at least one of the data trees, the memory having computer-executable instructions stored thereon that, when executed by the processing unit, cause the processing unit to:
receive a lookup request;
upon receiving the lookup request, determine a performance characteristic of the packet forwarding device;
if the performance characteristic is less than a predetermined threshold, retrieve the lookup request by:
performing K hash functions on the lookup request to obtain K outputs, each of the outputs being associated with a bin;
identifying the bin associated with each of the K outputs;
determining whether a counter of the bin associated with each of the K outputs is nonzero;
upon determining that the counter of the bin associated with each of the K outputs is nonzero, identifying the bin having the counter with a lowest value;
identifying a data tree linked to the bin having the counter with the lowest value; and
retrieving an entry corresponding to the lookup request from the identified data tree, and if the performance characteristic is greater than the predetermined threshold, retrieving the lookup request by:

retrieving an entry corresponding to the lookup request from the at least one of the data trees including each of the data nodes.

17. The packet forwarding device of claim 16, wherein the performance characteristic includes a ratio of a time constant related to performing a hash function to a time constant related to retrieving a lookup request from the at least one of the data trees including each of the data nodes.

18. The packet forwarding device of claim 17, wherein the performance characteristic is defined by $$2^{\left(\frac{p \times K}{h}\right)},$$

where p is a time constant related to performing a hash function, K is a number of hash functions and h is a time constant related to retrieving a lookup request from the at least one of the data trees including each of the data nodes.

19. The packet forwarding device of claim 18, wherein the performance characteristic is less than the predetermined threshold when $$n > 2^{\left(\frac{p \times K}{h}\right)} \text{ and } N > 2^{\left(\frac{p \times K}{h}\right)},$$

and the performance characteristic is greater than the predetermined threshold when $$n < 2^{\left(\frac{p \times K}{h}\right)} \text{ or } N < 2^{\left(\frac{p \times K}{h}\right)},$$

where p is a time constant related to performing a hash function, K is a number of hash functions, h is a time constant related to retrieving a lookup request from the at least one of the data trees including each of the data nodes, n is a number of the data nodes at a time of receipt of the lookup request and N is a maximum number of possible data nodes.

20. The packet forwarding device of claim 16, wherein the array is a Counting Bloom Filter and the plurality of data trees are AVL trees.

* * * * *